United States Patent
Menon et al.

(10) Patent No.: US 10,841,206 B2
(45) Date of Patent: Nov. 17, 2020

(54) FLOW MODIFICATION INCLUDING SHARED CONTEXT

(71) Applicant: 128 Technology, Inc., Burlington, MA (US)

(72) Inventors: Abilash Menon, Boxborough, MA (US); Anna Yungelson, Lexington, MA (US); Scott A. McCulley, Groton, MA (US); Robert Penfield, Concord, MA (US)

(73) Assignee: 128 Technology, Inc., Burlington, MA (US)

( * ) Notice: Subject to any disclaimer, the term of this patent is extended or adjusted under 35 U.S.C. 154(b) by 152 days.

(21) Appl. No.: 15/168,700

(22) Filed: May 31, 2016

(65) Prior Publication Data
US 2017/0346726 A1    Nov. 30, 2017

(51) Int. Cl.
*H04L 12/703* (2013.01)
*H04L 12/24* (2006.01)
(Continued)

(52) U.S. Cl.
CPC .......... *H04L 45/28* (2013.01); *H04L 41/0668* (2013.01); *H04L 43/0811* (2013.01);
(Continued)

(58) Field of Classification Search
CPC ............ H04L 41/0668; H04L 41/0813; H04L 41/5003; H04L 41/5009; H04L 43/10; H04L 43/12; H04L 43/16; H04L 43/026; H04L 43/087; H04L 43/0811; H04L 43/082; H04L 12/4633; H04L 29/06;
(Continued)

(56) References Cited

U.S. PATENT DOCUMENTS 6,515,963 B1   2/2003 Bechtolsheim et al.
6,563,824 B1   5/2003 Bhatia et al.
(Continued)

FOREIGN PATENT DOCUMENTS

CN   101552703 A   10/2009
CN   101646220 A   2/2010
(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.
(Continued)

*Primary Examiner* — Marsha D Banks Harold
*Assistant Examiner* — Dharmesh J Patel
(74) *Attorney, Agent, or Firm* — Nutter McClennen & Fish LLP

(57) ABSTRACT

Routing packets by a router involves establishing a first flow configured for forwarding the packets from a first ingress interface to a first egress interface of the router; determining a condition to modify the first flow; deactivating the first flow; establishing a second flow configured for forwarding the packets from at least one of (1) the first ingress interface to a second egress interface, (2) a second ingress interface to the first egress interface, or (3) a second ingress interface to a second egress interface; and activating the second flow.

30 Claims, 32 Drawing Sheets

(51) Int. Cl.
*H04L 12/26* (2006.01)
*H04L 12/707* (2013.01)
*H04L 12/801* (2013.01)

(52) U.S. Cl.
CPC .............. *H04L 45/22* (2013.01); *H04L 47/16* (2013.01); *H04L 43/10* (2013.01)

(58) Field of Classification Search
CPC ... H04L 29/06027; H04L 45/02; H04L 45/22; H04L 45/28; H04L 45/38; H04L 45/306; H04L 45/302; H04L 45/308; H04L 47/16; H04L 47/20; H04L 47/2441; H04L 49/90; H04L 49/103; H04L 49/253; H04L 49/205; H04L 49/602; H04L 65/80; H04L 69/14; H04L 69/22
See application file for complete search history.

(56) References Cited

U.S. PATENT DOCUMENTS

| | | |
|---|---|---|
| 6,584,071 B1 | 6/2003 | Kodialam et al. |
| 6,721,334 B1 | 4/2004 | Ketcham |
| 6,738,387 B1 | 5/2004 | Lin et al. |
| 6,778,531 B1 | 8/2004 | Kodialam et al. |
| 6,798,743 B1 | 9/2004 | Ma et al. |
| 7,020,143 B2 | 3/2006 | Zdan |
| 7,035,214 B1 | 4/2006 | Seddigh et al. |
| 7,106,739 B2 | 9/2006 | Beier |
| 7,154,902 B1 | 12/2006 | Sikdar |
| 7,218,632 B1 | 5/2007 | Bechtolsheim et al. |
| 7,315,541 B1 | 1/2008 | Housel et al. |
| 7,373,660 B1 | 5/2008 | Guichard et al. |
| 7,466,703 B1 | 12/2008 | Arunachalam et al. |
| 7,492,713 B1 | 2/2009 | Turner et al. |
| 7,536,720 B2 | 5/2009 | Burdett et al. |
| 7,634,805 B2 | 12/2009 | Aroya |
| 7,706,411 B2 | 4/2010 | Wakumoto et al. |
| 7,730,301 B2 | 6/2010 | Correll et al. |
| 7,773,611 B2 | 8/2010 | Booth, III et al. |
| 7,872,973 B2 | 1/2011 | Sterne et al. |
| 7,949,785 B2 | 5/2011 | Alkhatib et al. |
| 8,068,417 B1 | 11/2011 | Roberts |
| 8,094,560 B2 | 1/2012 | Bagepalli et al. |
| 8,139,479 B1 | 3/2012 | Raszuk |
| RE44,119 E | 4/2013 | Wang et al. |
| 8,437,248 B2 | 5/2013 | Li et al. |
| 8,527,641 B2 | 9/2013 | Degaonkar et al. |
| 8,570,893 B2 | 10/2013 | Guo et al. |
| 8,584,199 B1 | 11/2013 | Chen et al. |
| 8,634,428 B2 | 1/2014 | Le Pennec et al. |
| 8,699,373 B1 | 4/2014 | Pani |
| 8,705,524 B1 | 4/2014 | Kelly et al. |
| 8,804,489 B2 | 8/2014 | Lu et al. |
| 8,942,085 B1 | 1/2015 | Pani et al. |
| 8,989,020 B2 | 3/2015 | So |
| 9,059,920 B2 | 6/2015 | Ravindran et al. |
| 9,160,652 B2 | 10/2015 | Taillon et al. |
| 9,240,953 B2 | 1/2016 | Carlstrom |
| 9,246,800 B1 | 1/2016 | Ramamoorthi et al. |
| 9,276,864 B1 | 3/2016 | Vincent |
| 2001/0030649 A1 | 10/2001 | Mamiya et al. |
| 2002/0044553 A1 | 4/2002 | Chakravorty |
| 2002/0075883 A1 | 6/2002 | Dell et al. |
| 2002/0176363 A1 | 11/2002 | Durinovic-Johri et al. |
| 2003/0016628 A1* | 1/2003 | Kadambi et al. |
| 2003/0198189 A1 | 10/2003 | Roberts et al. |
| 2003/0214938 A1 | 11/2003 | Jindal et al. |
| 2004/0088542 A1 | 5/2004 | Daude et al. |
| 2004/0264481 A1 | 12/2004 | Darling et al. |
| 2005/0036616 A1 | 2/2005 | Huang et al. |
| 2005/0063307 A1 | 3/2005 | Samuels et al. |
| 2005/0182932 A1 | 8/2005 | Wheeler |
| 2005/0238022 A1 | 10/2005 | Panigrahy |
| 2006/0146813 A1 | 7/2006 | Biswas et al. |
| 2006/0176894 A1 | 8/2006 | Oh et al. |
| 2007/0171825 A1 | 7/2007 | Roberts et al. |
| 2007/0171826 A1 | 7/2007 | Roberts et al. |
| 2007/0253418 A1 | 11/2007 | Shiri et al. |
| 2008/0159145 A1* | 7/2008 | Muthukrishnan ... H04L 49/1523 370/235 |
| 2008/0214175 A1 | 9/2008 | Papadoglou et al. |
| 2009/0003212 A1* | 1/2009 | Kwan et al. |
| 2009/0007021 A1 | 1/2009 | Hayton |
| 2009/0059958 A1 | 3/2009 | Nakata |
| 2010/0125898 A1 | 5/2010 | Dubuc et al. |
| 2010/0191968 A1 | 7/2010 | Patil et al. |
| 2011/0007743 A1 | 1/2011 | Kuwabara et al. |
| 2011/0069714 A1 | 3/2011 | Le Pennec et al. |
| 2011/0299554 A1 | 12/2011 | Ros-Giralt et al. |
| 2012/0144061 A1 | 6/2012 | Song |
| 2012/0236860 A1 | 9/2012 | Kompella et al. |
| 2013/0227166 A1 | 8/2013 | Ravindran et al. |
| 2013/0229922 A1 | 9/2013 | Li et al. |
| 2013/0230051 A1 | 9/2013 | Lockwood |
| 2013/0297824 A1 | 11/2013 | Lan et al. |
| 2014/0040488 A1 | 2/2014 | Small et al. |
| 2015/0188814 A1 | 7/2015 | Jain et al. |
| 2015/0215841 A1 | 7/2015 | Hsu et al. |
| 2015/0229618 A1 | 8/2015 | Wan et al. |
| 2015/0372898 A1* | 12/2015 | Haramaty .............. H04L 49/557 370/225 |
| 2015/0372916 A1 | 12/2015 | Haramaty et al. |
| 2015/0381324 A1 | 12/2015 | Mirsky et al. |
| 2016/0036694 A1 | 2/2016 | Abdul et al. |
| 2016/0094444 A1 | 3/2016 | MeLampy et al. |
| 2016/0105471 A1 | 4/2016 | Nunes et al. |
| 2016/0164780 A1 | 6/2016 | Timmons et al. |
| 2016/0344565 A1 | 11/2016 | Batz et al. |
| 2016/0344715 A1 | 11/2016 | Kumar et al. |
| 2016/0344803 A1 | 11/2016 | Batz et al. |
| 2017/0063681 A1 | 3/2017 | Kaplan et al. |
| 2017/0063927 A1 | 3/2017 | Schultz et al. |
| 2017/0171110 A1 | 6/2017 | Gosselin et al. |
| 2017/0250906 A1 | 8/2017 | MeLampy et al. |

FOREIGN PATENT DOCUMENTS

| | | |
|---|---|---|
| CN | 101068242 B | 4/2010 |
| CN | 102158371 A | 8/2011 |
| CN | 102594600 | 7/2012 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 418 705 | 4/2006 |
| EP | 1 313 267 | 12/2006 |
| EP | 2 339 784 | 6/2011 |
| GB | 1 473 898 A | 5/1977 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated.Oct. 22, 2012.

Cisco Systems, *Parallel Express Forwarding on the Cisco 10000 Series*, (White Paper) Cisco Systems, 4 pages, printed Jun. 17, 2015.

(56) References Cited

OTHER PUBLICATIONS

Data Plane Development Kit, *Programmer's Guide*, Release 16.04. 0, 216 pages, Apr. 12, 2016.
Davis, *Layer 3 Switches Explained*, Happy Router, 6 pages, dated Aug. 30, 2007.
Filsfils, et al., *Segment Routing Architecture*, Network Working Group, Draft, 28 pages, Oct. 21, 2013.
Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.
Herbert, *xps: Transmit Packet Steering*, Eklektix, Inc., 11 pages, Oct. 26, 2010.
Iana, *Transmission Control Protocol (TCP) Parameters*, (www.iana.org/assignments/tcp-parameters/tcp-parameters.xhtm), 5 pages, dated Sep. 22, 2014.
Katz et al., *Bidirectional Forwarding Detection (BFD)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of: TCP/IP abc's*, PC Magazine Encyclopedia (www.pcmag.com/encyclopedia/term/52615), 5 pages, 2005.
Previdi, et al., *IPv6 Segment Routing Header (SRH)*, Network Working Group, Draft, 24 pages, Jul. 3, 2014.
Roberts, *The Next Generation of IP—Flow Routing*, SSGRR 2003S International Conference, L'Aquila, Italy, 11 pages, Jul. 29, 2003.
Rouse, *What is routing table?* Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management* https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.
Apostolopoulos et al., "Design, Implementation and Performance of a Content-Based Switch", In INFOCOM 2000, Proceedings of the Nineteenth Annual Joint Conference of the IEEE Computer and Communications Societies, Tel Aviv, Israel, 10 pages, Mar. 26-30, 2000.
Suchara et al., "Network architecture for joint failure recovery and traffic engineering", SIGMETRICS '11, Proceedings of the ACM SIGMETRICS Joint International Conference on Measurement and Modeling of Computer Systems, San Jose, CA, USA, pp. 97-108, Jun. 7-11, 2011.
Yi et al., "A case for stateful forwarding plane", Computer Communications, Elsevier, vol. 36, No. 7, pp. 779-791, Apr. 2013.
International Searching Authority, International Search Report—International Application No. PCT/US2017/032907, dated Aug. 3, 2017, together with the Written Opinion of the International Searching Authority, 8 pages.
International Searching Authority, International Search Report—International Application No. PCT/US2017/032702, dated Aug. 17, 2017, together with the Written Opinion of the International Searching Authority, 8 pages.
International Searching Authority, International Search Report—International Application No. PCT/US2017/032475, dated Aug. 24, 2017, together with the Written Opinion of the International Searching Authority, 9 pages.
International Searching Authority, International Search Report—International Application No. PCT/US2017/032478, dated Aug. 24, 2017, together with the Written Opinion of the International Searching Authority, 9 pages.
International Searching Authority, International Search Report—International Application No. PCT/US2017/032905, dated Sep. 3, 2017, together with the Written Opinion of the International Searching Authority, 9 pages.

\* cited by examiner

AIPR 1   708

Session X

Return Association (RA)

SSA   1.1.1.1

SSP   10

SDA   5.5.5.5

SDP   20

SPR   100

Forward Association (FA)

SSA   2.2.2.2        (implicit)

SSP   30           (session source port assigned by AIPR 1  708)

SDA   3.3.3.3        (next node address - AIPR 2  714)

SDP   40           (session destination port assigned by AIPR 1  708)

SPR   100

Flag = First Waypoint AIPR

Session Y

RA

FA

Flag

Session Z

RA

FA

Flag

*FIG. 9*

AIPR 2   714

Session X

Return Association (RA)

SSA    2.2.2.2

SSP    30

SDA    3.3.3.3      (implicit)

SDP    40

SPR    100

Forward Association (FA)

SSA    3.3.3.3      (implicit)

SSP    50          (session source port assigned by AIPR 2  714)

SDA    4.4.4.4      (next node address - AIPR 4  722)

SDP    60          (session destination port assigned by AIPR 2  714)

SPR    100

Flag = Intermediate Waypoint AIPR

Session Y

RA

FA

Flag

Session Z

RA

FA

Flag

*FIG. 10*

AIPR 4    722

Session X

Return Association (RA)

SSA   3.3.3.3

SSP   50

SDA   4.4.4.4      (implicit)

SDP   60

SPR   100

Forward Association (FA)

SSA   1.1.1.1      (original source address from metadata)

SSP   10           (original source port from metadata)

SDA   5.5.5.5      (original destination address from metadata)

SDP   20           (original destination port from metadata)

SPR   100

Flag = Final Waypoint AIPR

Session Y

RA

FA

Flag

Session Z

RA

FA

Flag

*FIG. 11*

FLOW MODIFICATION INCLUDING SHARED CONTEXT

CROSS-REFERENCE TO RELATED APPLICATION(S)

This patent application is related to U.S. patent application Ser. No. 14/497,954 filed Sep. 26, 2014, entitled, "NETWORK PACKET FLOW CONTROLLER," and naming MeLampy, Baj, Kaplan, Kumar, Penfield, and Timmons as inventors, the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," and naming Timmons, Baj, Kaplan, MeLampy, Kumar, and Penfield as inventors, the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," and naming Kumar, Timmons, and MeLampy as inventors, the disclosure of which is incorporated herein, in its entirety, by reference.

This patent application also is related to U.S. patent application Ser. No. 14/963,999, filed Dec. 9, 2015, entitled, "ROUTER WITH OPTIMIZED STATISTICAL FUNCTIONALITY," and naming Gosselin, Yungelson, Baj, and MeLampy as inventors, the disclosure of which is incorporated herein, in its entirety, by reference.

This patent application also is related to U.S. patent application Ser. No. 14/833,571, filed Aug. 24, 2015, entitled, "NETWORK PACKET FLOW CONTROLLER WITH EXTENDED SESSION MANAGEMENT," and naming Kaplan, Kumar, Timmons, and MeLampy as inventors, the disclosure of which is incorporated herein, in its entirety, by reference.

This patent application also is related to U.S. patent application Ser. No. 15/054,781, filed Feb. 26, 2016, entitled, "NAME-BASED ROUTING SYSTEM AND METHOD," and naming MeLampy, Baj, Kumar, Penfield, and Timmons as inventors, the disclosure of which is incorporated herein, in its entirety, by reference.

This patent application is also related to U.S. patent application Ser. No. 15/168,712, filed on even date herewith, entitled "DETECTING SOURCE NETWORK ADDRESS TRANSLATION IN A COMMUNICATION SYSTEM," the disclosure of which is incorporated herein, in its entirety, by reference.

This patent application is also related to U.S. patent application Ser. No. 15/169,188, filed on even date herewith, entitled "SESSION CONTINUITY IN THE PRESENCE OF SOURCE NETWORK ADDRESS TRANSLATION," the disclosure of which is incorporated herein, in its entirety, by reference.

FIELD OF THE INVENTION

The present invention relates to data routing and, more particularly, to routing packets based on words and relationships between named elements.

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header in accordance with an Internet routing protocol such as BGP, OSPFv2, IS-IS, etc. Among other benefits, this routing scheme enables network devices to forward different packets of a single datagram along different routes to reduce network congestion, or avoid malfunctioning network devices.

Those skilled in the art thus refer to IP as a "stateless" protocol because, among other reasons, it does not save packet path data, and does not pre-arrange transmission of packets between end points.

Current Internet routing protocols generally cannot route packets from an element in one private network to an element in another private network because the IP address spaces used for elements in those private networks often overlap. These are often referred to as "unroutable" addresses, which are not useful on the public Internet. Therefore, Network Address Translation (NAT) is often used to convert between local addresses used for routing within the private networks and public Internet addresses used for routing over the public Internet. The public Internet address is used to route packets between the private networks. Within each private network, other information in the packet is used to determine the local address used to route the packet to the destination entity within the destination private network.

Over the past decade, network challenges have evolved from bandwidth and broadband availability to security and mobility. Cloud has emerged as a primary service delivery architecture that achieves economies of scale unheard of in the past. Cloud embraces sharing of resources, including computing and storage. This has created a huge number of new requirements unmet by today's IP routing models, such as:

- Private-network to private-networking models
- Dynamically-arranged, service-specific Quality of Service
- Unified IPv4 and IPv6 routing tables
- Authenticated directional routing
- On-the-fly encryption
- Overlapping address support
- Load balancing instead of equal-cost multipath (ECMP)
- Integrated DPI and resulting flow analytics To meet these requirements, current architectures require middleboxes (e.g., firewalls, DPI devices, load balancers) mixed with overlay networking (e.g., VLANs, nested VLANs, VxLANs, MPLS, Cisco ACI, VMware NSX, Midonet) and orchestration (e.g., OpenStack, service function chaining).

SUMMARY OF VARIOUS EMBODIMENTS

In accordance with one embodiment, a method of forwarding packets by a router involves establishing a first flow configured for forwarding the packets from a first ingress interface to a first egress interface of the router, determining a condition to modify the first flow, deactivating the first flow, establishing a second flow configured for forwarding the packets from at least one of (1) the first ingress interface to a second egress interface, (2) a second ingress interface to the first egress interface, or (3) a second ingress interface to a second egress interface, and activating the second flow.

In accordance with another embodiment, a router comprises a plurality of communication interfaces, a computer storage, and a packet router configured to implement a method of forwarding packets comprising establishing a first flow configured for forwarding the packets from a first ingress interface to a first egress interface of the router, determining a condition to modify the first flow, deactivating the first flow, establishing a second flow configured for forwarding the packets from at least one of (1) the first ingress interface to a second egress interface, (2) a second ingress interface to the first egress interface, or (3) a second ingress interface to a second egress interface, and activating the second flow.

In accordance with another embodiment, a computer program product comprising a tangible, non-transitory computer readable medium has embodied therein a computer program that, when run on at least one computer processor, implements a packet router for a router, the packet router implementing a method of routing packets comprising establishing a first flow configured for forwarding the packets from a first ingress interface to a first egress interface of the router, determining a condition to modify the first flow, deactivating the first flow, establishing a second flow configured for forwarding the packets from at least one of (1) the first ingress interface to a second egress interface, (2) a second ingress interface to the first egress interface, or (3) a second ingress interface to a second egress interface, and activating the second flow.

In various alternative embodiments, the methods may further involve associating the first and second flows with a predetermined communication session for the packets. The predetermined communication session may be based on a predetermined set of information associated with the packets. Establishing the first flow may involve running a stateful routing protocol to determine at least the first egress interface, in which case the method may further involve forwarding, using the second flow, at least one packet including session metadata associated with the predetermined communication session. The first flow may be modified under a variety of conditions. For example, the first flow may be modified upon receiving a packet on the second ingress interface, upon detecting a failure associated with an ingress communication link and/or an egress communication link, or based on a route change that affects the first flow. In certain embodiments, the first flow may include an action chain having a chain descriptor linked to a first set of functional blocks, in which case establishing the second flow may involve establishing a second set of functional blocks and linking the second set of functional blocks to the chain descriptor. The router may include a packet router having a service path that establishes the first and second flows and a forwarding path that uses the first and second flows to forward packets. The method may further involve storing context information associated with the first flow, linking the second flow to the stored context information, and using the stored context information to forward packets using the second flow.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with a first waypoint AIPR based on the lead packet processing of FIG. 8, in accordance with one exemplary embodiment.

FIG. 10 is a schematic diagram showing session-related data associated with an intermediate waypoint AIPR based on the lead packet processing of FIG. 8, in accordance with one exemplary embodiment.

FIG. 11 is a schematic diagram showing session-related data associated with a final waypoint AIPR based on the lead packet processing of FIG. 8, in accordance with one exemplary embodiment.

DESCRIPTION OF ILLUSTRATIVE EMBODIMENTS

Exemplary embodiments are directed to techniques for modifying an existing "flow" within the router that is used for forwarding session packets between an ingress interface and an egress interface. Because the communication system is dynamic, under some circumstances, it may become necessary or desirable for a router to modify a flow for a session that is associated with a particular ingress interface and egress interface. For example, under some circumstances, the router may modify the flow to be associated with a different egress interface (e.g., to forward packets received on the ingress interface via a different egress interface whether to the same downstream node or a different downstream node), while under other circumstances, the router may modify the flow to be associated with a different ingress port (e.g., if packets associated with the session/flow are routed by upstream nodes to a different ingress interface of the router). In exemplary embodiments, the router deactivates the existing flow for the session, sets up a new flow for the session while the existing flow is deactivated (during which time any packets received with respect to the existing flow may receive special handling, e.g., by directing the packets to the service path, buffering the packets until the new flow is activated, or dropping the packets), and then activates the new flow so that received packets can then be forwarded by the new flow.

Networks

Illustrative embodiments preferably are implemented within an otherwise conventional computer network that uses common networking devices and protocols. Among other things, a network includes at least two nodes and at least one communication link between the nodes. Nodes can include computing devices (sometimes referred to as hosts or devices) and routers. Computers can include personal computers, smart phones, television "cable boxes," automatic teller machines (ATMs) and many other types of equipment that include processors and network interfaces. Links can include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
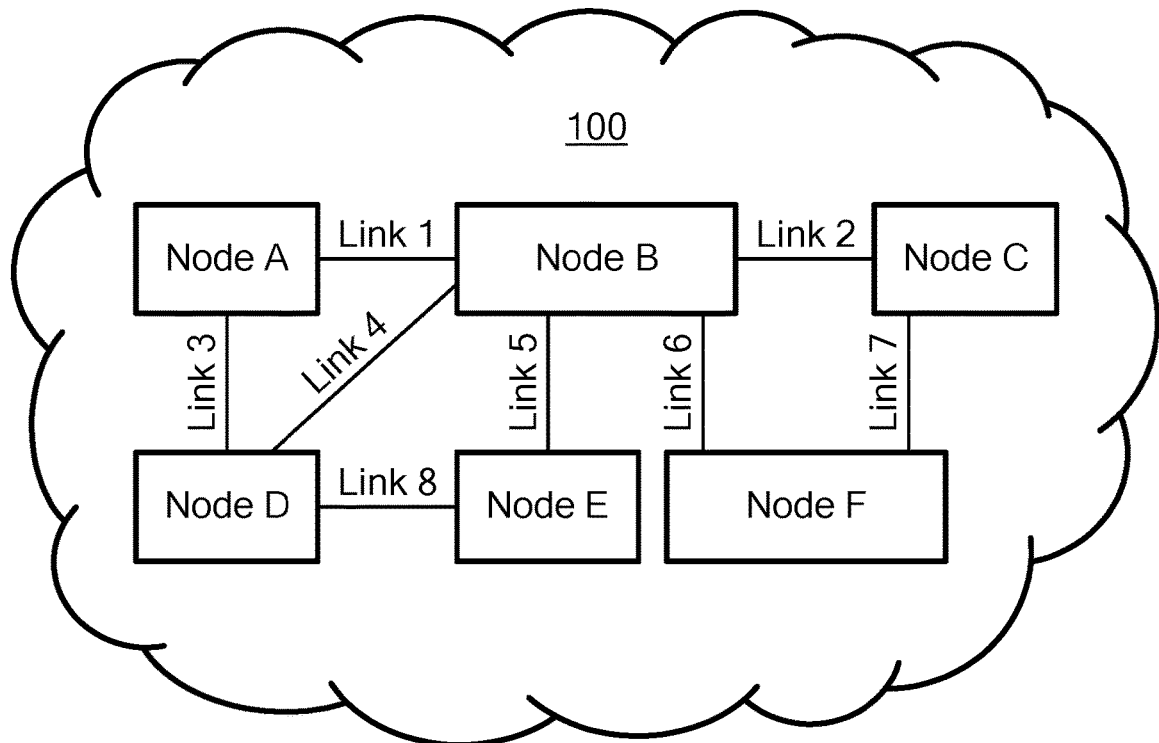
FIG. 1 schematically shows a hypothetical prior art network that may implement certain illustrative embodiments of the invention.

A node can be directly connected to one or more other nodes, each via a distinct communication link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Nodes A-F and all the links 1-8 together make up a network 100. For simplicity, a network is depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of a sending node (the "source address") and the network address of an intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Another commonly used Transport Layer protocol is the User Datagram Protocol (UDP). Each layer performs a logical function and abstracts the layer below it, therefore hiding details of the lower layer. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit source and destination IP addresses, whereas IPv6 utilizes 128-bit source and destination IP addresses. TCP is described generally in IETF RFC 793, which is hereby incorporated herein by reference in its entirety. UDP is described generally in IETF RFC 768, which is hereby incorporated herein by reference in its entirety.

Figure 2:
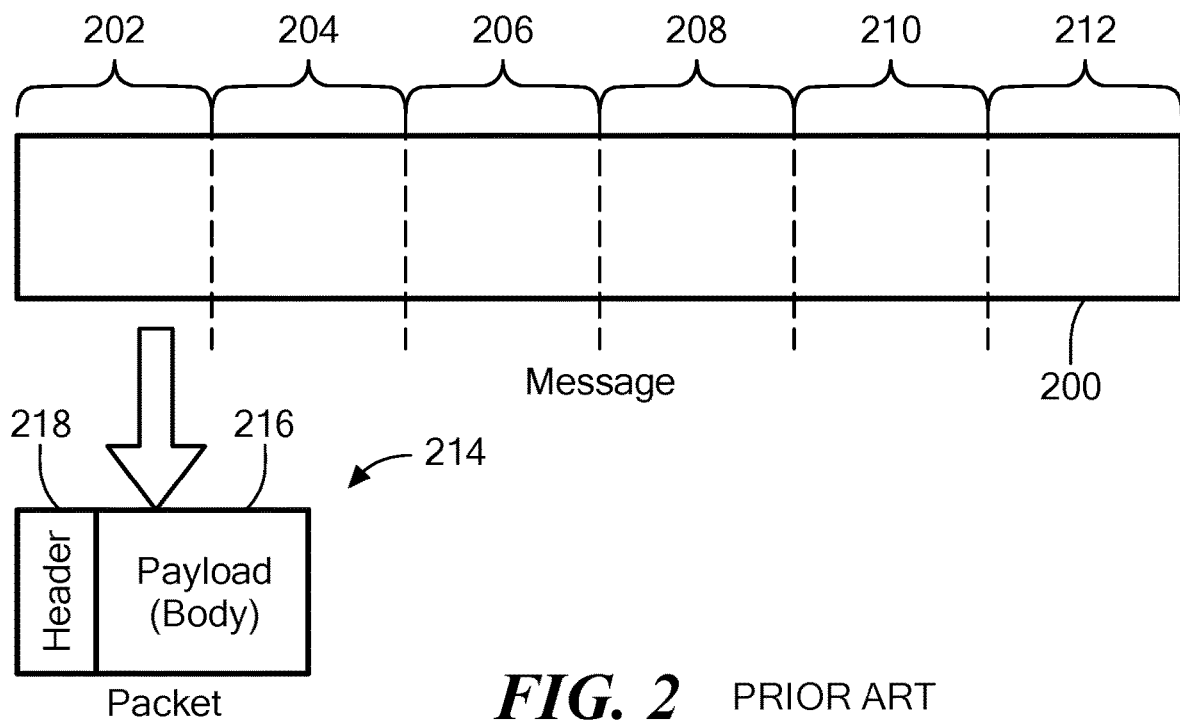
FIG. 2 schematically illustrates a prior art technique for fragmenting a message.

For example, a Layer 3 message may be fragmented into smaller Layer 2 packets if Layer 2 (Data Link Layer) cannot handle the Layer 3 message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol can fragment Layer 4 (Transport Layer) messages into segments, officially referred to as TCP protocol data units (PDUs), if Layer 3 (Network Layer) cannot handle the Layer 4 (Transport Layer) message as one transmission. Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
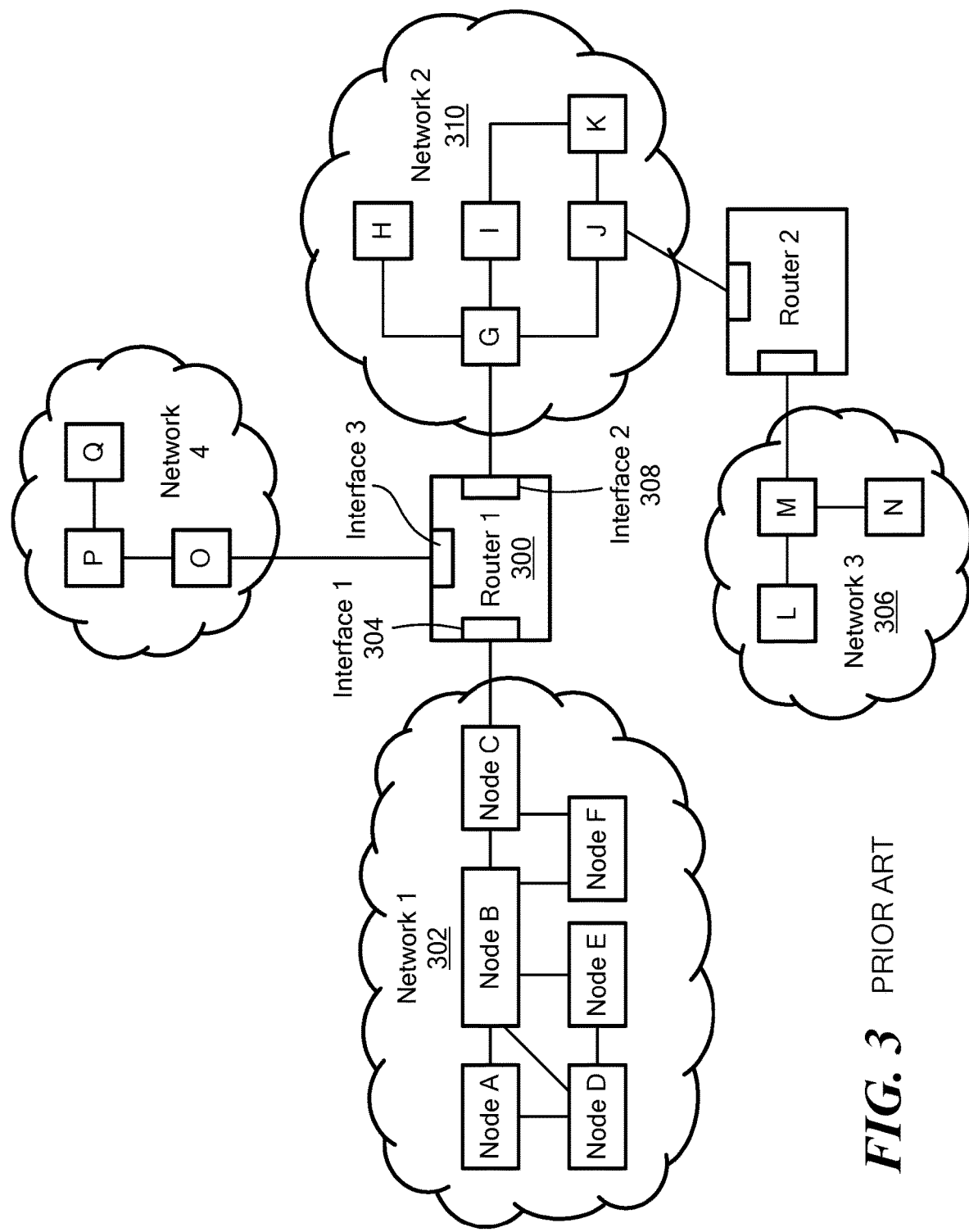
FIG. 3 schematically shows a hypothetical internet that may implement certain illustrative embodiments of the invention.

As depicted schematically in FIG. 3, a router typically acts as a node that interconnects two or more distinct networks or two or more sub-networks (subnets) of a single network, thereby creating a "network of networks" (i.e., an internet). Thus, a router has at least two interfaces; e.g., where each interface connects the router to a different network, as exemplified by Router 1 300 in FIG. 3. Each router also includes a packet router (not shown in FIG. 3 for convenience) that is configured to route packets between the various interfaces based on routing information stored in a routing table. As part of routing packets or otherwise, the packet router is configured to process packets received by the router and to generate packets for transmission by the router.

When a router receives a packet via one interface from one network, it uses information stored in its routing table (sometimes referred to as a "Forwarding Information Base" or "FIB") to direct the packet to another network via another interface, e.g., based on the destination address in the packet, or based on a combination of information in the packet. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each IP packet as an independent transaction that is unrelated to any previous IP packet. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Certain illustrative embodiments, however, may include routers that statefully communicate, as discussed herein.

As noted, when a router receives a packet via one interface from one network, the router uses its routing table to direct the packet to another network. The following is some of the types of information typically found in a basic IP routing table:

Destination: Partial IP address (Expressed as a bit-mask) or Complete IP address of a packet's final destination;

Next hop: IP address to which the packet should be forwarded on its way to the final destination;

Interface: Outgoing network interface to use to forward the packet;

Cost/Metric: Cost of this path, relative to costs of other possible paths;

Routes: Information about subnets, including how to reach subnets that are not directly attached to the router, via one or more hops; default routes to use for certain types of traffic or when information is lacking.

Routing tables may be filled in manually, such as by a system administrator, or dynamically by the router. Routers generally run routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

Additionally, routers also may utilize the Bidirectional Forwarding Detection (BFD) protocol to monitor communication links to adjacent routers. The BFD protocol is described in IETF RFC 5880, which is hereby incorporated herein by reference in its entirety. In many cases, the BFD protocol can detect the failure of a communication link before the routing protocol detects the failure, so, in some situations, the BFD protocol can provide advanced warning to the router that a routing change is needed or is forthcoming.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client computer executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. In some cases, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Router Architecture

Figure 4:
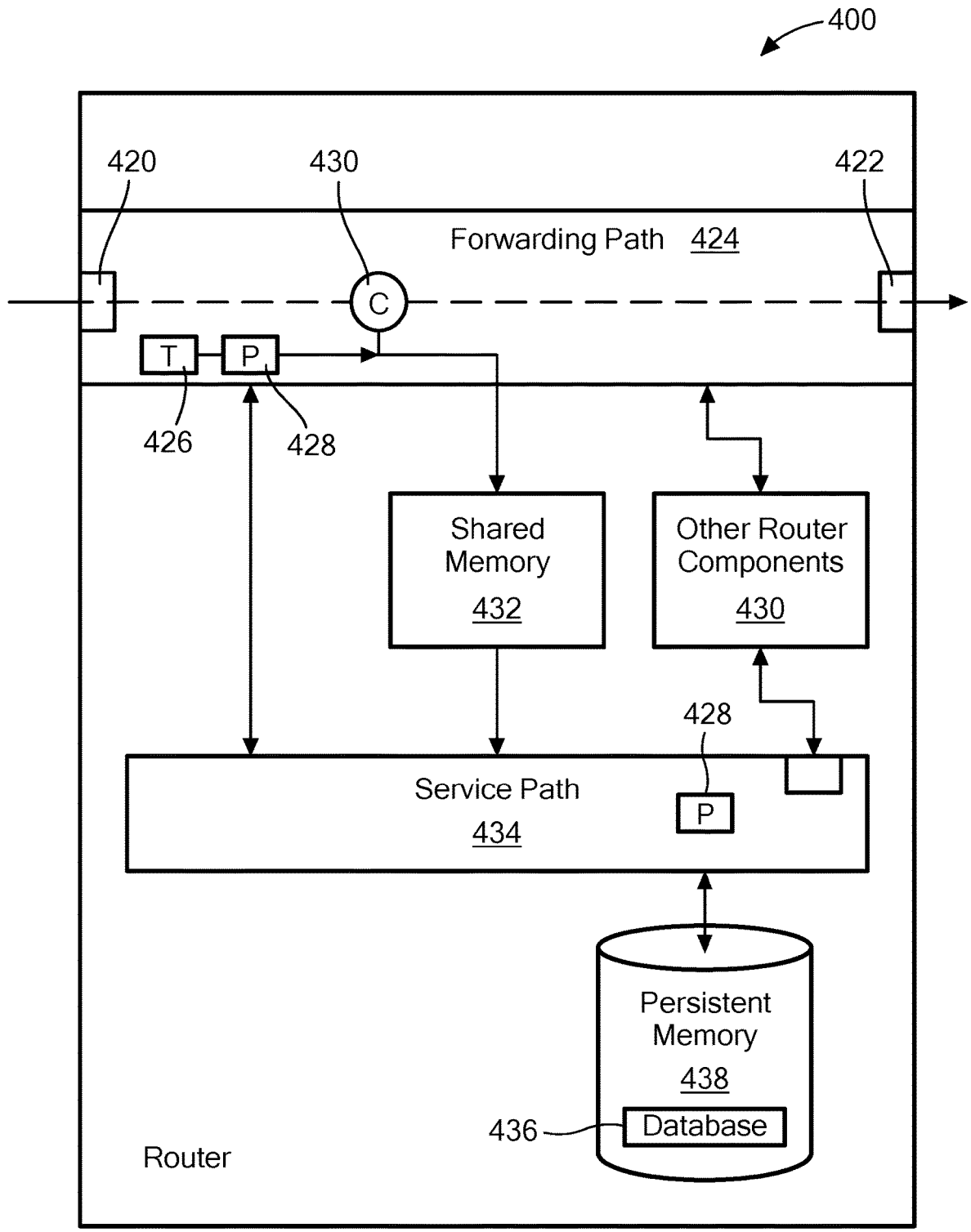
FIG. 4 schematically shows relevant portions of a router including a forwarding path and a service path, in accordance with one exemplary embodiment.

In certain exemplary embodiments (but not necessarily all embodiments), one or more routers may be configured, architecturally, such that the packet router includes two processing pathways or planes, namely a "forwarding path" and a "service path." FIG. 4 schematically shows relevant portions of a router that may be used to implement certain illustrative embodiments of the invention. It should be noted that the router 400 shown in FIG. 4 is a significantly simplified representation of a router used for illustrative purposes. The present invention is not limited to the router architecture shown in FIG. 4 or to any particular router architecture.

Among other things, the router 400 includes a number of interfaces (two are shown in FIG. 4 for convenience, specifically reference number "420" and reference number "422") for receiving packets from other network devices or nodes and/or for forwarding packets to other network devices or nodes. These interfaces are similar to those shown in FIG. 3 and identified as Interfaces 1, 2 and 3. As such, each interface can act as an input or output. For discussion purposes only, however, interface 420 of the router 400 of FIG. 4 is considered an input for receiving packets, while interface 422 is considered an output to forward packets to other network devices. Indeed, those skilled in the art understand that such interfaces can have both input and output functionality.

The router 400 also has a forwarding path 424 that forwards packets through the router 400 from the input interface 420 to the output interface 422. Specifically, as known by those skilled in the art, the forwarding path 424 (also known as a "fast path," "forwarding plane," "critical path," or "data plane") contains the logic for determining how to handle and forward inbound packets received at the input interface 420. Among other things, the forwarding path 424 may include the prior noted routing table (identified in FIG. 4 by reference number "426") and one or more processors/cores (all processors in FIG. 4 are identified by reference number "428") for directing the package through the forwarding fabric of the router 400 to the appropriate output interface 422. To those ends, the forwarding path 424 includes, among other things, logic for (1) decoding the packet header, (2) looking up the destination address of the packet header, (3) analyzing other fields in the packet, and (4) processing data link encapsulation at the output interface 422.

As known by those in the art, the forwarding path 424 may be considered to have a dynamically varying line rate of forwarding packets from the input interface 420 to the output interface 422. Indeed, this line rate is a function of the processing power of the processors 428 within the forwarding path 424, its routing algorithms, and the volume of packets it is forwarding. As noted below, some embodiments may configure the forwarding path 424 to have a minimum line rate that the forwarding path 424 should maintain.

The router 400 also has a service path 434 that is separate from the forwarding path 424. The service path 434 has logic/processing devices 428 configured to perform various processing functions. Among other things, the service path 434 typically runs one or more routing protocols and optionally also the BFD protocol in order to obtain routing and link status information, which it may store in a database 436 within a persistent memory 438 (e.g., a flash drive or hard drive) that can be internal to the router 400 as shown in FIG. 4 or optionally can be external to the router 400. The service path 434 typically also processes packets that cannot be processed completely by the forwarding path, such as, for example, packets that are specifically destined for router 400 or special processing involved with "stateful" routing (e.g., special processing of a first session packet containing special metadata) as discussed below. For example, the forwarding path 424 may redirect certain packets it receives to the service path 434 for special processing. Depending on the type of packet received, the service path 434 may terminate the received packet (e.g., without generating any packet to be transmitted), may create a return packet for the forwarding path 424 to forward back to the source of the received packet (e.g., over the input interface 420), or may create a forward packet for the forwarding path 424 to forward to another device (e.g., over the output interface 422).

The router 400 may have a shared memory 432 (e.g., RAM) and/or other shared router components 440 that permit the forwarding path 424 and the service path 434 to share information and in some embodiments also to communicate directly or indirectly with one another. For example, as discussed above, the forwarding path 424 may redirect packets to the service path 434 for processing, and the service path may generate packets to be forwarded by the forwarding path 424. Also, the forwarding path 424 may have one or more counters 430 that gather statistical information about packets traversing through the forwarding path 424, and these counters 430 may be stored in the shared memory 432 to allow the service path 434 to access the counters 430 for processing and optional storage in a database 436 within a persistent memory 438 (e.g., a flash drive or hard drive) that can be internal to the router 400 as shown in FIG. 4 or optionally can be external to the router 400. One advantage of this architecture is that time-intensive tasks can be offloaded from the forwarding path 424 and instead performed by the service path 434.

Typically, the service path 434 is responsible for managing the routing table 426 (e.g., via a shared memory 432 or via direct or indirect communication) to set up routing information (sometimes referred to herein as "flows") to be used by the forwarding path 424. The routing table 426 may be stored in the shared memory 432 so that it can be accessed as needed by both the forwarding path 424 and the service path 434. Based on information obtained from a routing protocol and/or other protocols, the service path 424 may determine routes and update the routing table 426 with such routes.

Figure 5:
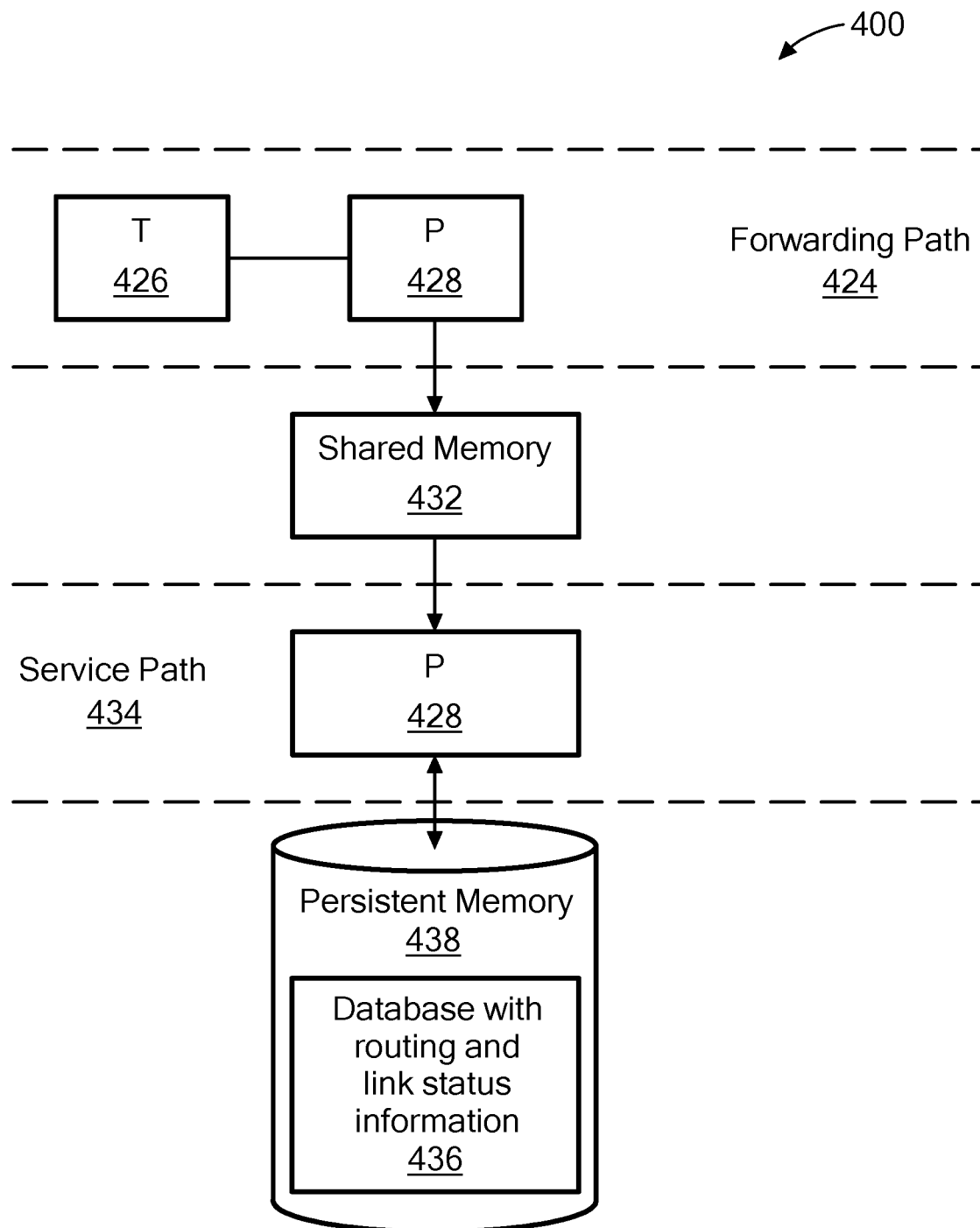
FIG. 5 schematically shows additional details of shared management of a routing table by the forwarding path and the service path of FIG. 4, in accordance with certain illustrative embodiments.

FIG. 5 schematically shows additional details of shared management of the routing table by the forwarding path 424 and the service path 434, in accordance with certain illustrative embodiments.

Routing Flows

Certain exemplary embodiments are described herein with reference to a construct referred to as a "flow." Generally speaking, a flow is a descriptor used internally by the router (e.g., by the forwarding path 424 of certain routers) to process and forward a particular set of packets (e.g., packets having a certain destination address or range of destination addresses, or packets associated with a particular "session" as discussed below with reference to "stateful" routing). In certain exemplary embodiments, a flow is associated with an ingress port on which such packets are expected to be received and an egress port over which such packets are to be forwarded. A flow typically also defines the type(s) of processing to be performed on such packets (e.g., decompress packets, decrypt packets, enqueue packets for forwarding, etc.). When a packet arrives at an interface of a router, the router attempts to find a flow that is associated with the packet (e.g., based on the destination address of the packet, or based on a session with which the packet is associated as discussed below). Generally speaking, if the router locates an active flow for the packet, then the router processes the packet based on the flow, but if the router cannot locate an active flow for the packet, then the router processes the packet (e.g., by the service path 434 of certain routers).

In certain exemplary embodiments, each flow is associated with an "action chain" established for the flow. Each action chain includes a series of functional blocks, with each functional block having a specific function associated with routing packets associated with the session/flow (e.g., decompress packets, decrypt packets, enqueue packets for forwarding, etc.). The action chains associated with different sessions/flows can have different functional blocks depending on the type of processing needed for the session/flow. In routers of the type shown and described with reference to FIG. 4, action chains may be stored in the shared memory 432, thereby allowing the forwarding path 424 to use the action chains and the service path 434 to manipulate the action chains as discussed below.

In certain exemplary embodiments, each action chain has a leading "chain descriptor" that includes two fields:

1. A pointer field containing a pointer to the first functional block in the action chain, and
2. A "valid" field (e.g., one or more bits) that is used to indicate whether the action chain is valid or invalid. Typically, one particular value of the valid field is used to indicate that the action chain is valid and can be used, while another value of the valid field is used to indicate that the action chain is invalid/deactivated.

Figure 6:
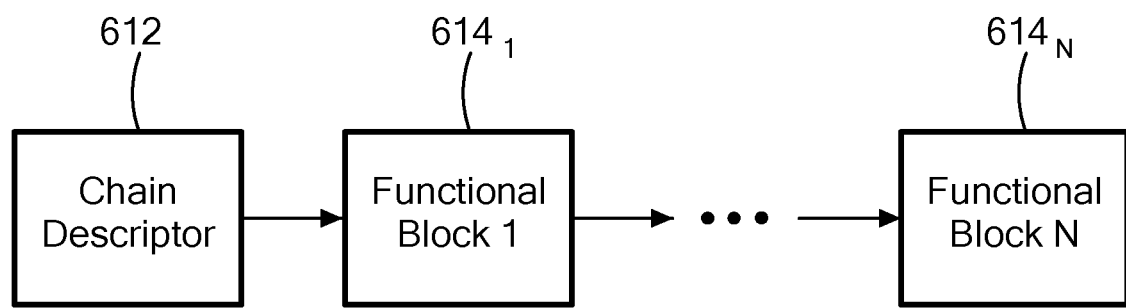
FIG. 6 is a schematic diagram of an action chain used to process and forward packets, in accordance with one exemplary embodiment.

FIG. 6 is a schematic diagram of an action chain, in accordance with one exemplary embodiment. As discussed above, the action chain includes a chain descriptor 612 and a number of functional blocks $614_1$-$614_N$. A packet is processed by first locating the action chain associated with the packet and then executing each functional block in order to effectuate processing/forwarding of the packet.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" or "backward" or "return" packets or the "reverse" or "backward" or "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible.

The AIPRs through which the lead packet passes insert special metadata into the lead packet and optionally also into return packets as needed to allow each AIPR on the path to determine whether there is a prior AIPR on the path and whether there is a next hop AIPR on the path. In order to force session packets to traverse the same set of AIPRs, each successive AIPR typically changes the destination address field in each session packet to be the address of the next hop AIPR and changes the source address field in each session packet to be its own network address. The last AIPR prior to the destination node then typically will change the source and destination address fields back to the original source and destination addresses used by the source node. In this way, session packets can be forwarded, hop by hop, from the source node through the set of AIPRs to the destination node, and vice versa.

Figure 7:
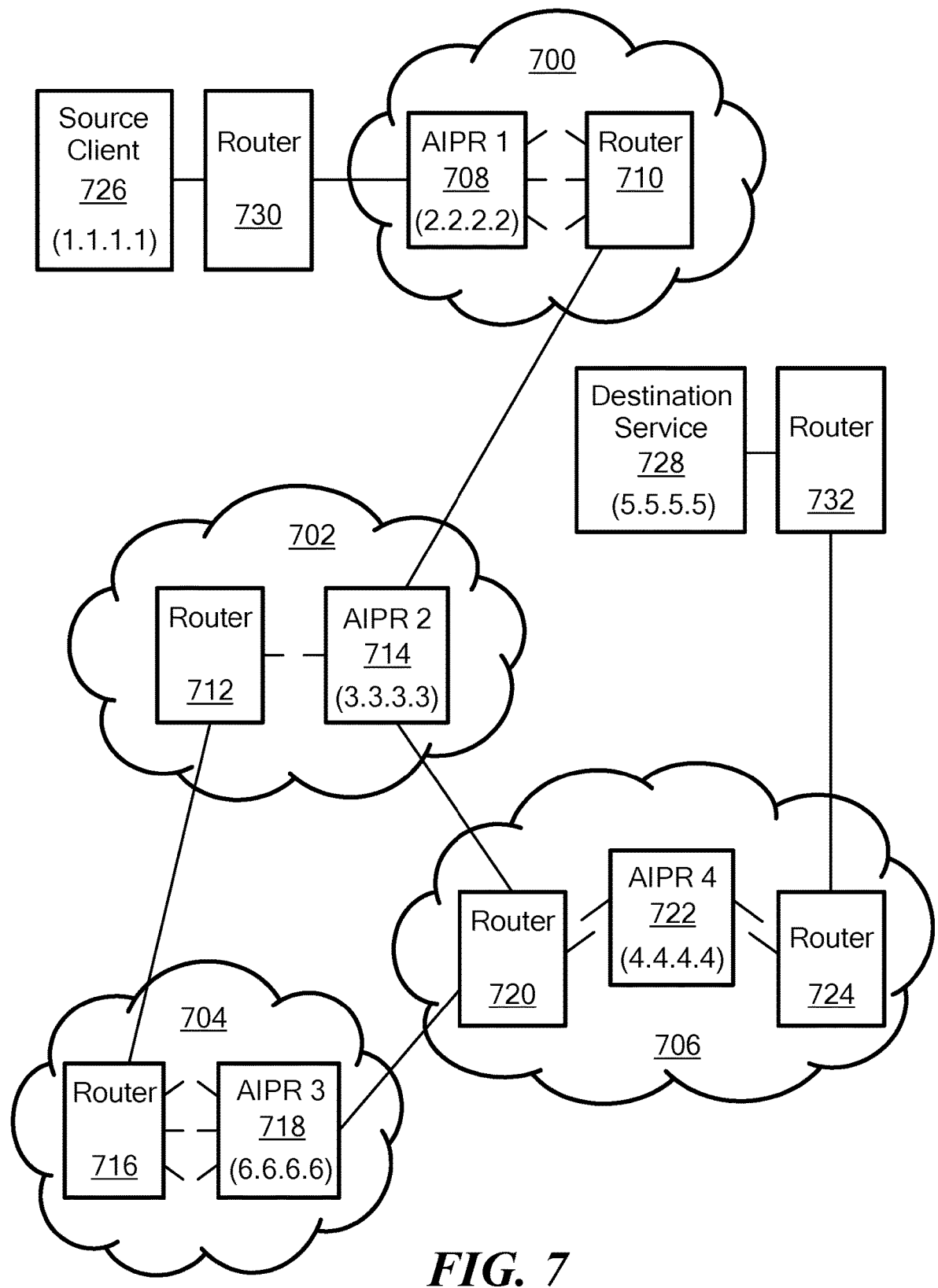
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
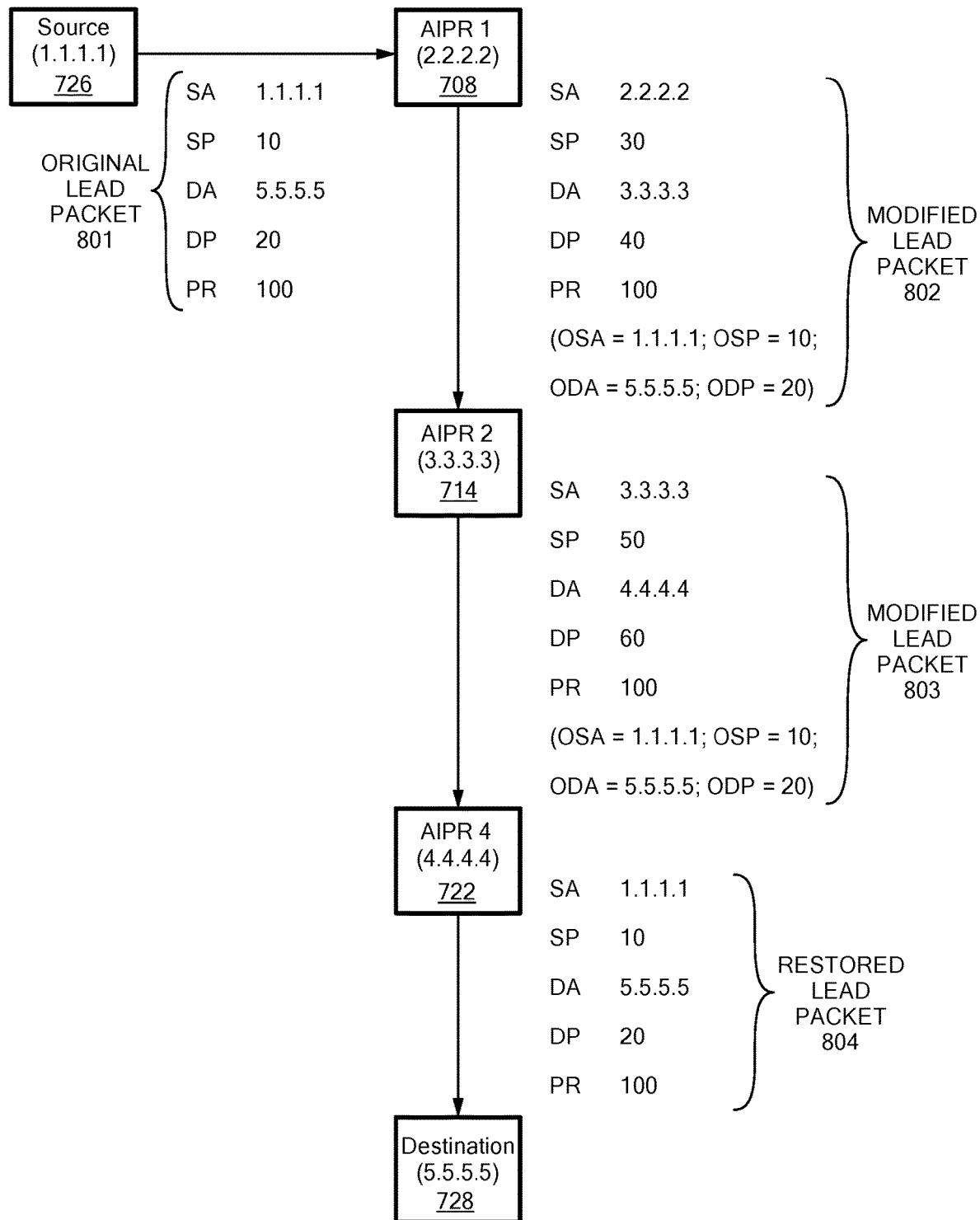
FIG. 8 schematically shows an example of lead packet processing from a source node to a destination node for stateful routing, in accordance with one exemplary embodiment.
Figure 12:
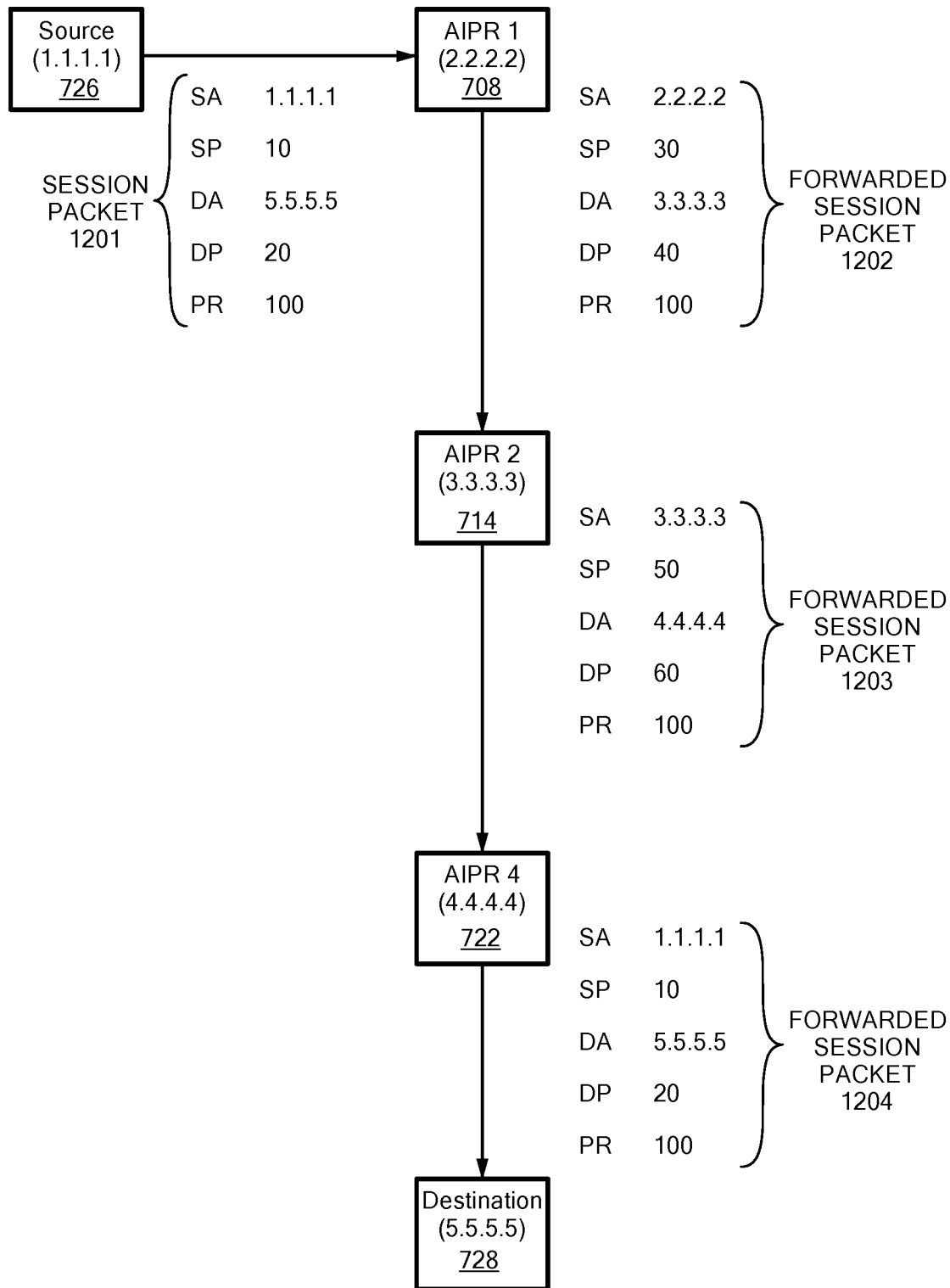
FIG. 12 is a schematic diagram providing an example of session packet processing for an example packet sent from the source device to the destination device through the AIPR devices for the session established in FIG. 8, in accordance with one exemplary embodiment.
Figure 13:
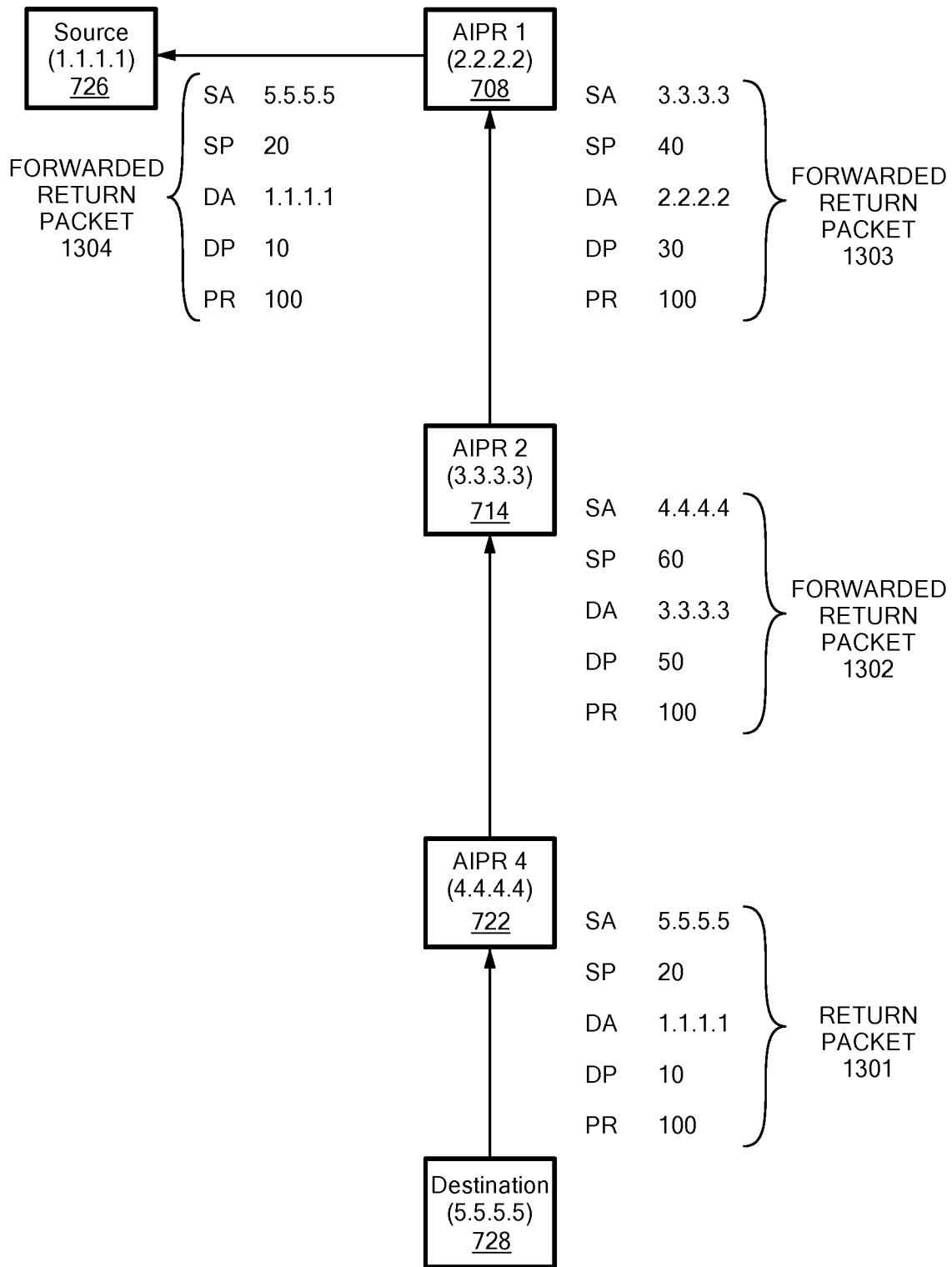
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with certain illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing interface for a particular destination network address, but also the next waypoint AIPR (if any) to use for that destination network address. In this example, the nodes communicate using TCP/IP-based messages, and the metadata inserted into the lead packet may be conveyed, for example, as a TCP Option field or added to the TCP packet as payload data. In various alternative embodiments, the nodes may communicate using other protocols, and the method in which the metadata is conveyed in the lead packet would be protocol-specific.

As noted above, in stateful routing, all forward packets associated with a particular session are made to follow the same path through a given set of AIPRs on their way from the source client node 726 to the destination service node 728. In a similar manner, all return packets associated with the session typically, but not necessarily, are made to traverse the same set of AIPRs in reverse order on their way from the destination service node 728 to the source client node 726 (which may be referred herein to as "bi-flow").

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example, for a TCP/IP-based session, AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path. AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11. Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, randomly).

Figure 14:
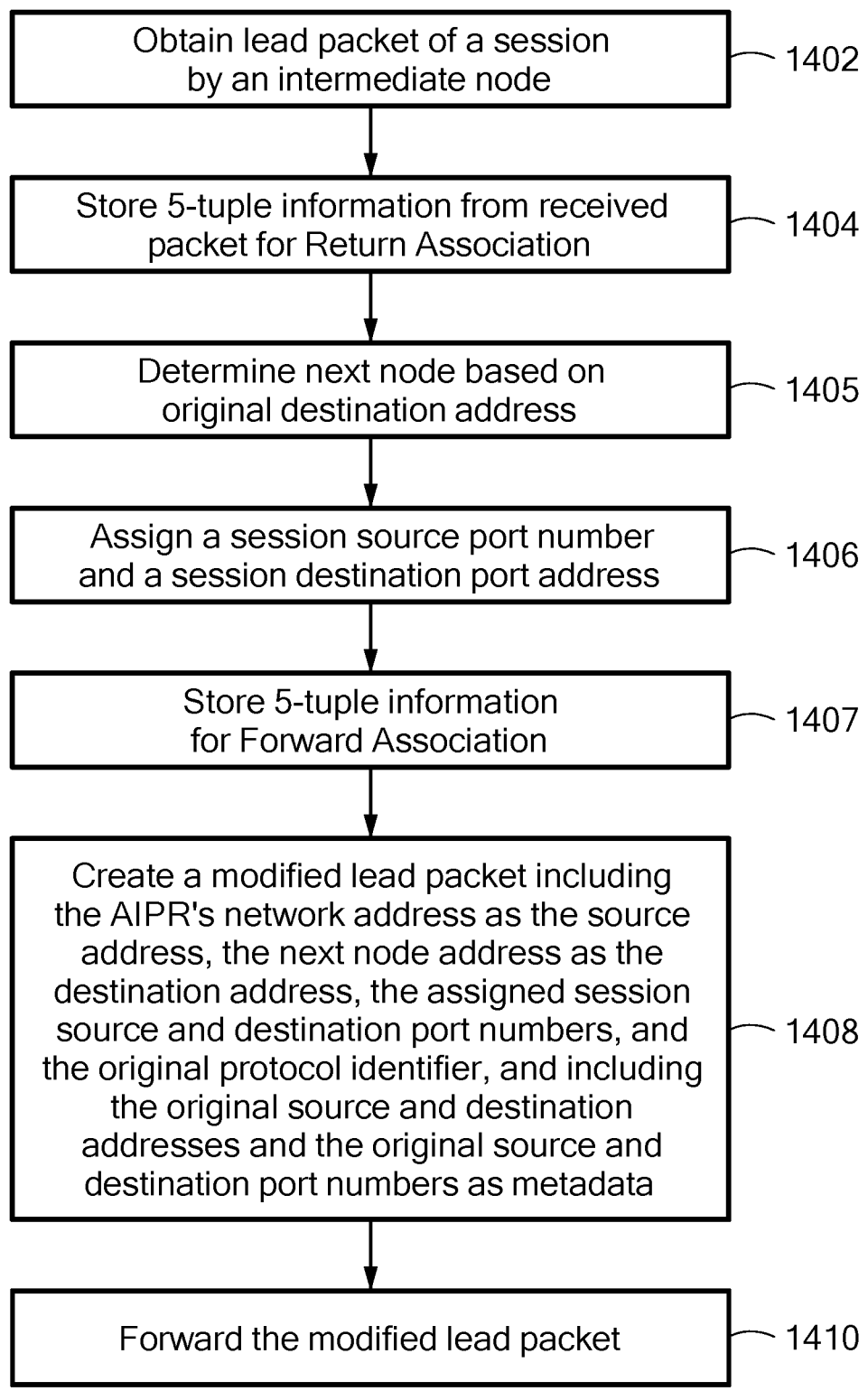
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next waypoint AIPR based on the original destination address. This typically involves accessing the AIPR's routing information base from which the AIPR can determine the outgoing port and next waypoint AIPR (if any) for the original destination address.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
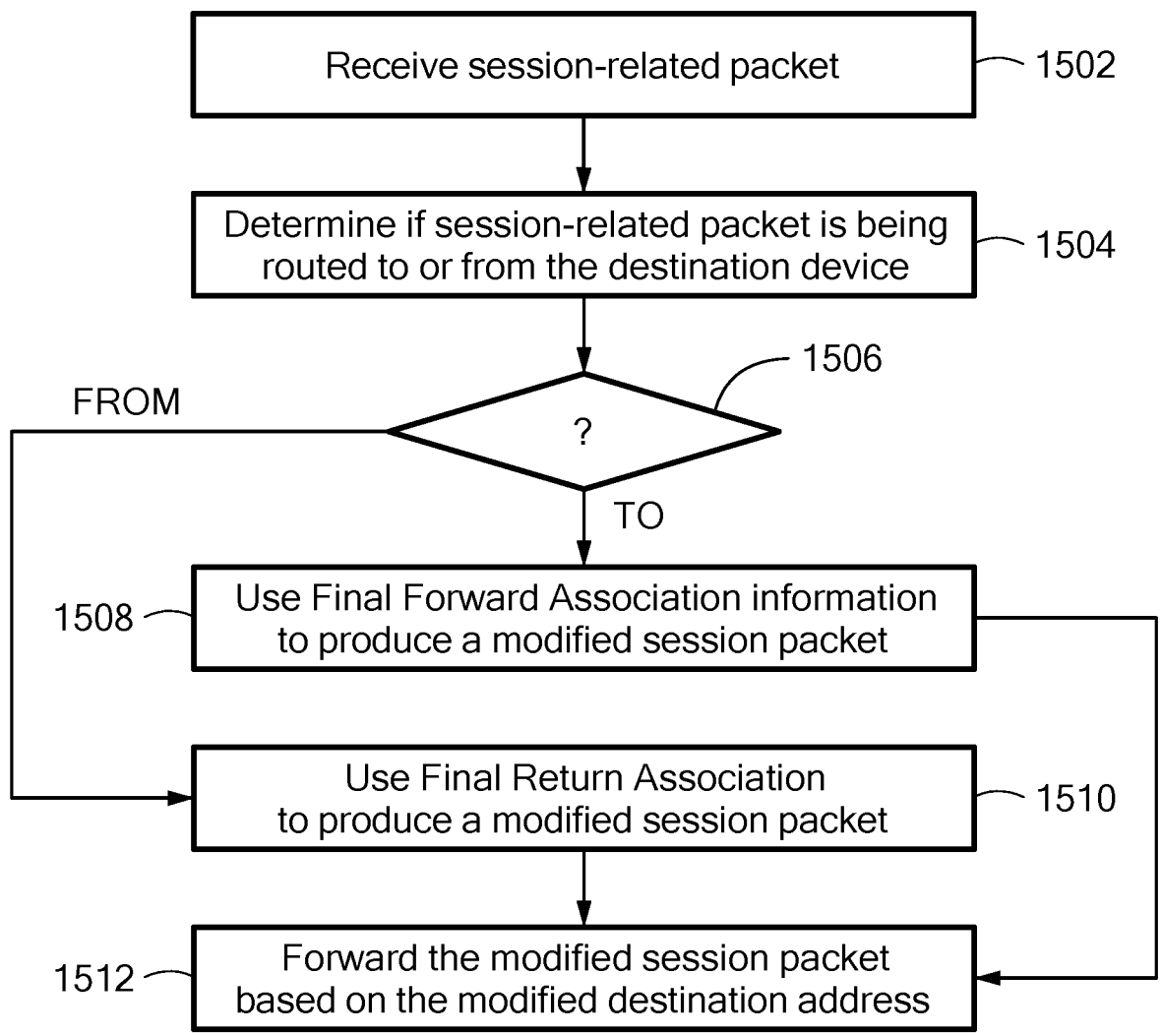
FIG. 15 is a flowchart schematically illustrating some session packet processing operations performed by an AIPR, in accordance with one exemplary embodiment.

FIG. 15 is a flowchart 1500 schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| SA | 2.2.2.2 | |
|---|---|---|
| SP | 10 | |
| DA | 5.5.5.5 | |
| DP | 20 | |
| PR | 100 | |
| SSP | 30 | (session source port number assigned by AIPR 1 708) |
| SDP | 40 | (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| SA | 3.3.3.3 | |
|---|---|---|
| SP | 10 | |
| DA | 5.5.5.5 | |
| DP | 20 | |
| PR | 100 | |
| SSP | 50 | (session source port number assigned by AIPR 2 714) |
| SDP | 60 | (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | | |
|---|---|---|
| SA | 4.4.4.4 | |
| SP | 10 | |
| DA | 5.5.5.5 | |
| DP | 20 | |
| PR | 100 | |
| SSP | 70 | (session source port number assigned by AIPR 4 722) |
| SDP | 80 | (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 in order to establish an end-to-end communication session between the source client node 726 and the destination service node 728.

Lead Packet Identification

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |

-continued

| Protocol | Destination Port | Technique for Start/End Determination |
|---|---|---|
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTF has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
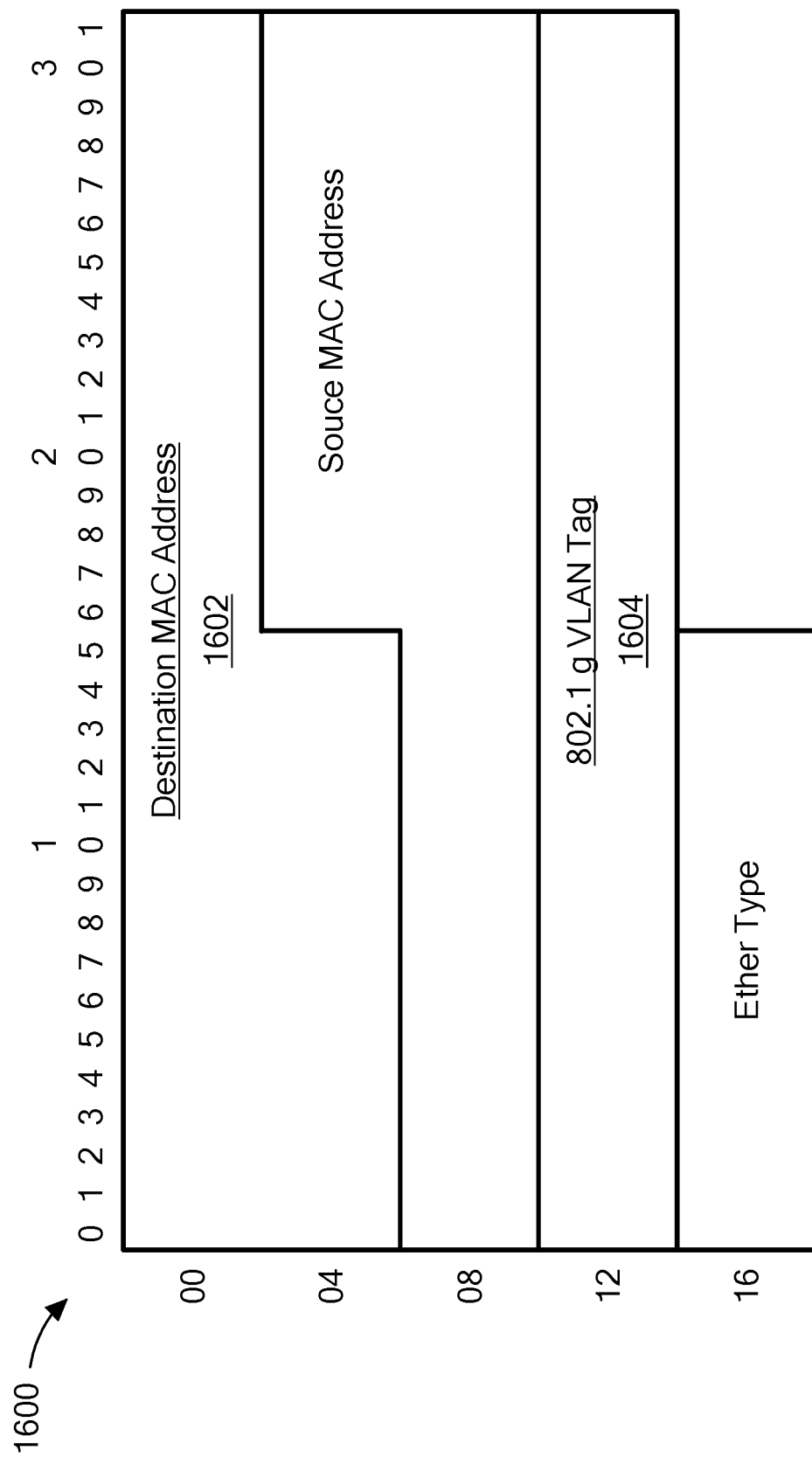
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
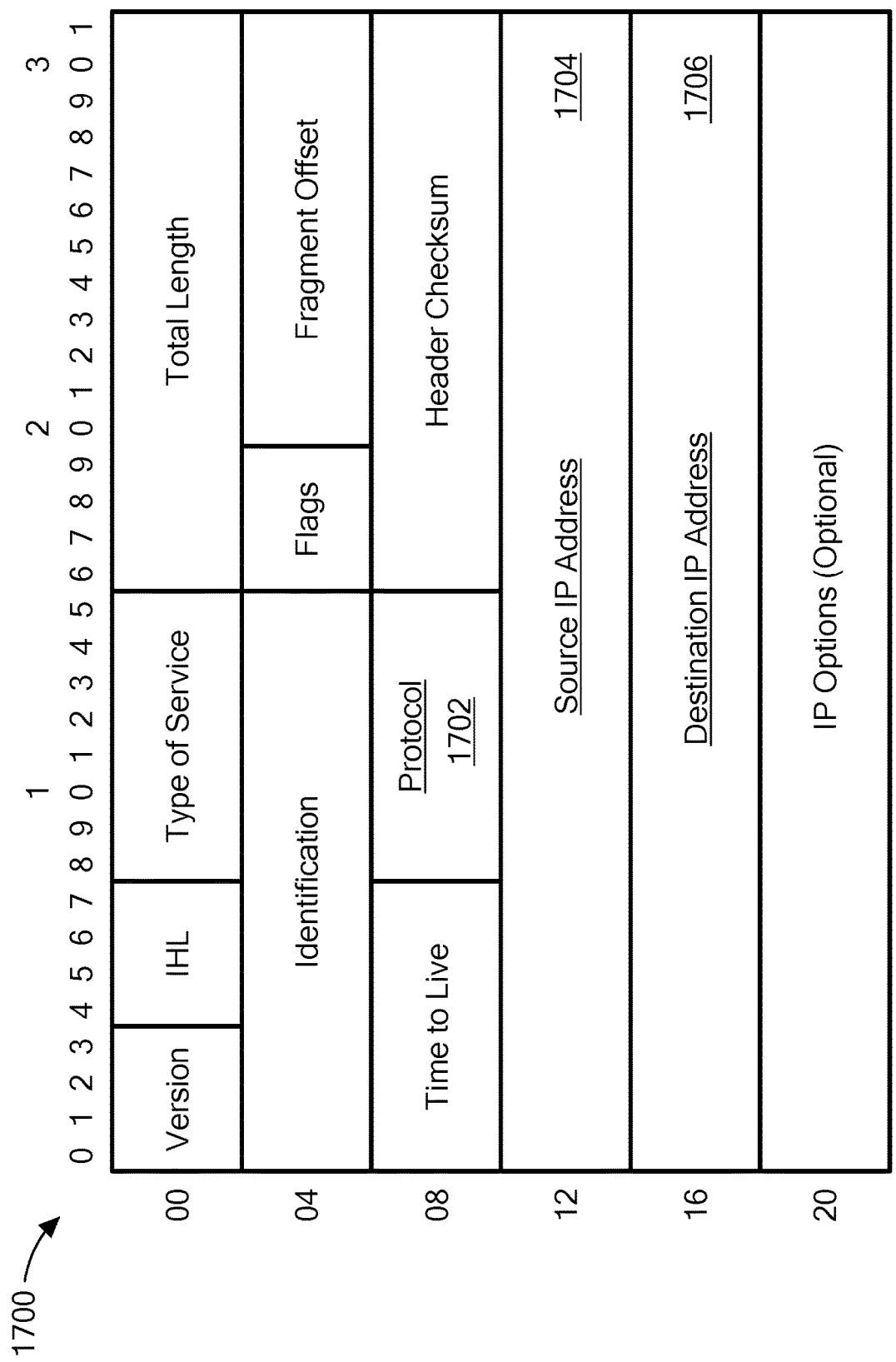
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
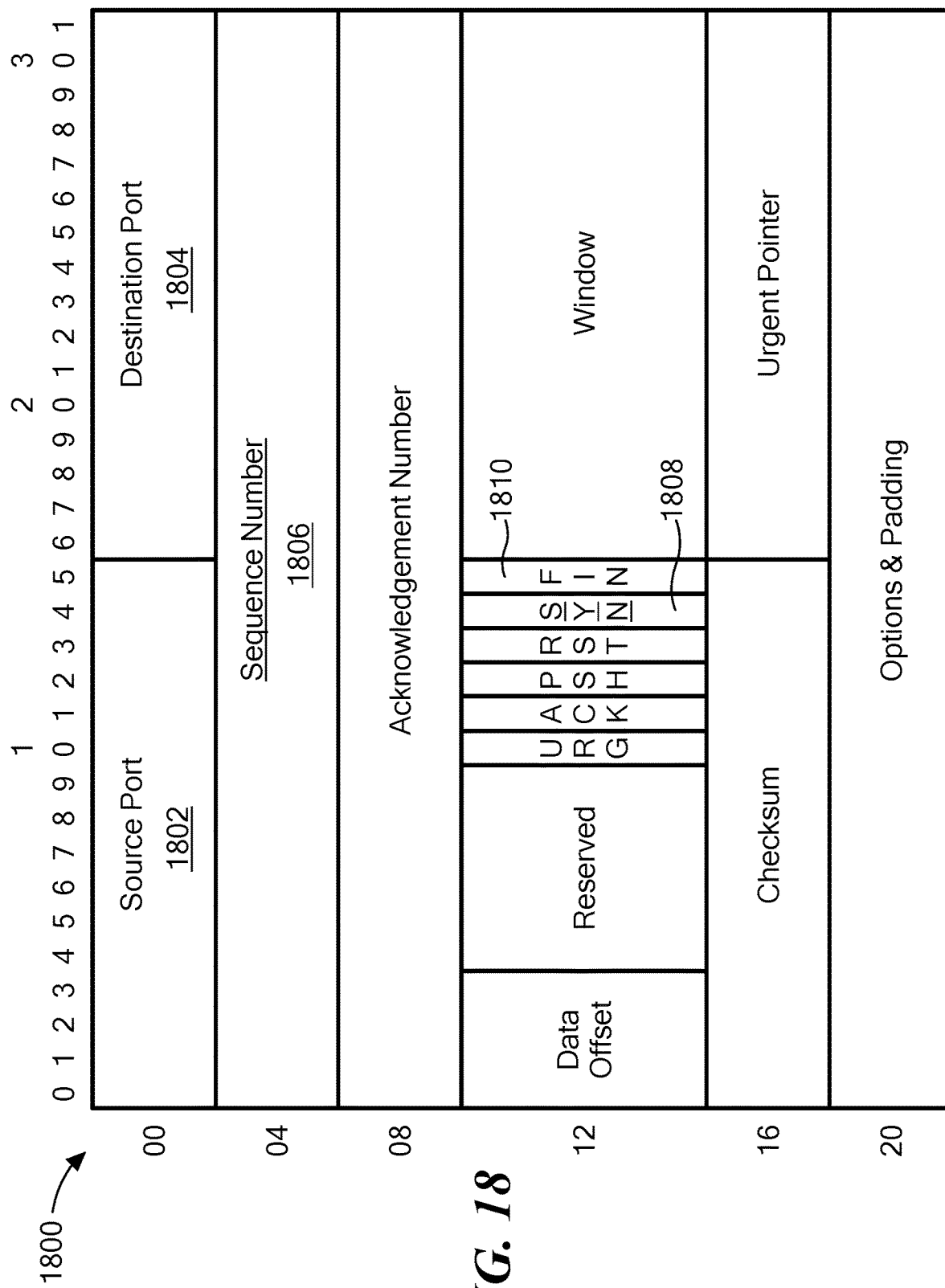
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
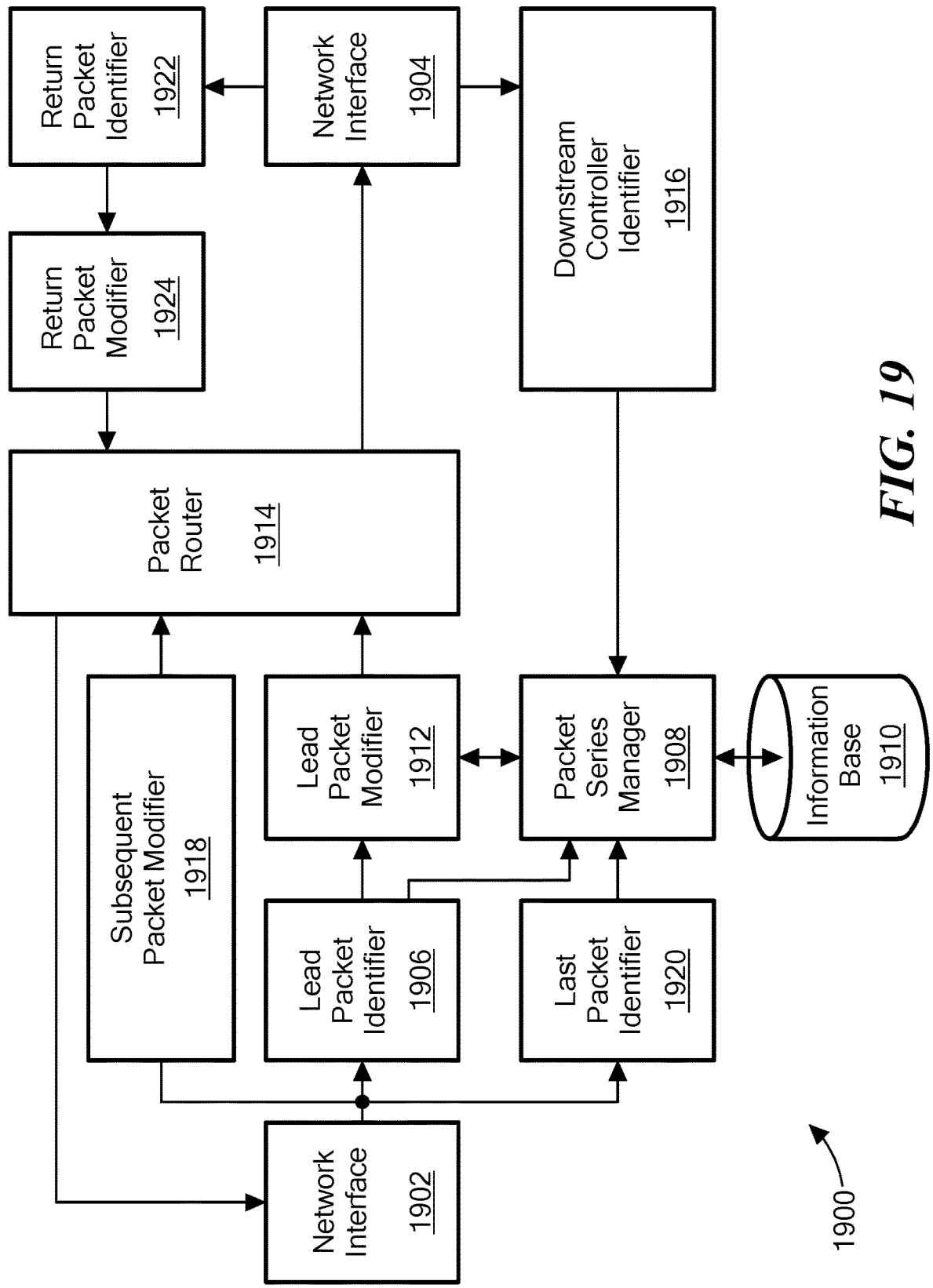
FIG. 19 schematically shows a block diagram of an AIPR of FIG. 7, in accordance with one exemplary embodiment.

FIG. 19 is a schematic block diagram of an AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/ destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager 1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
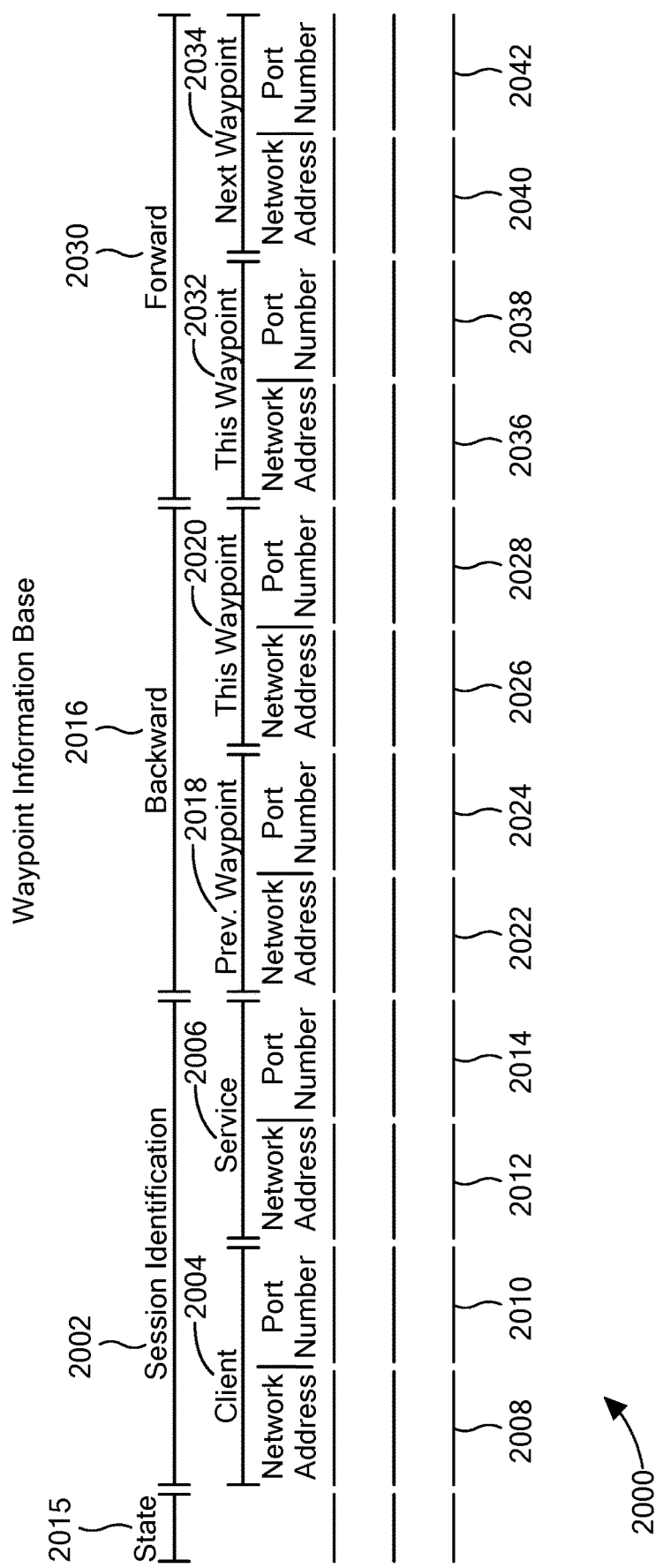
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
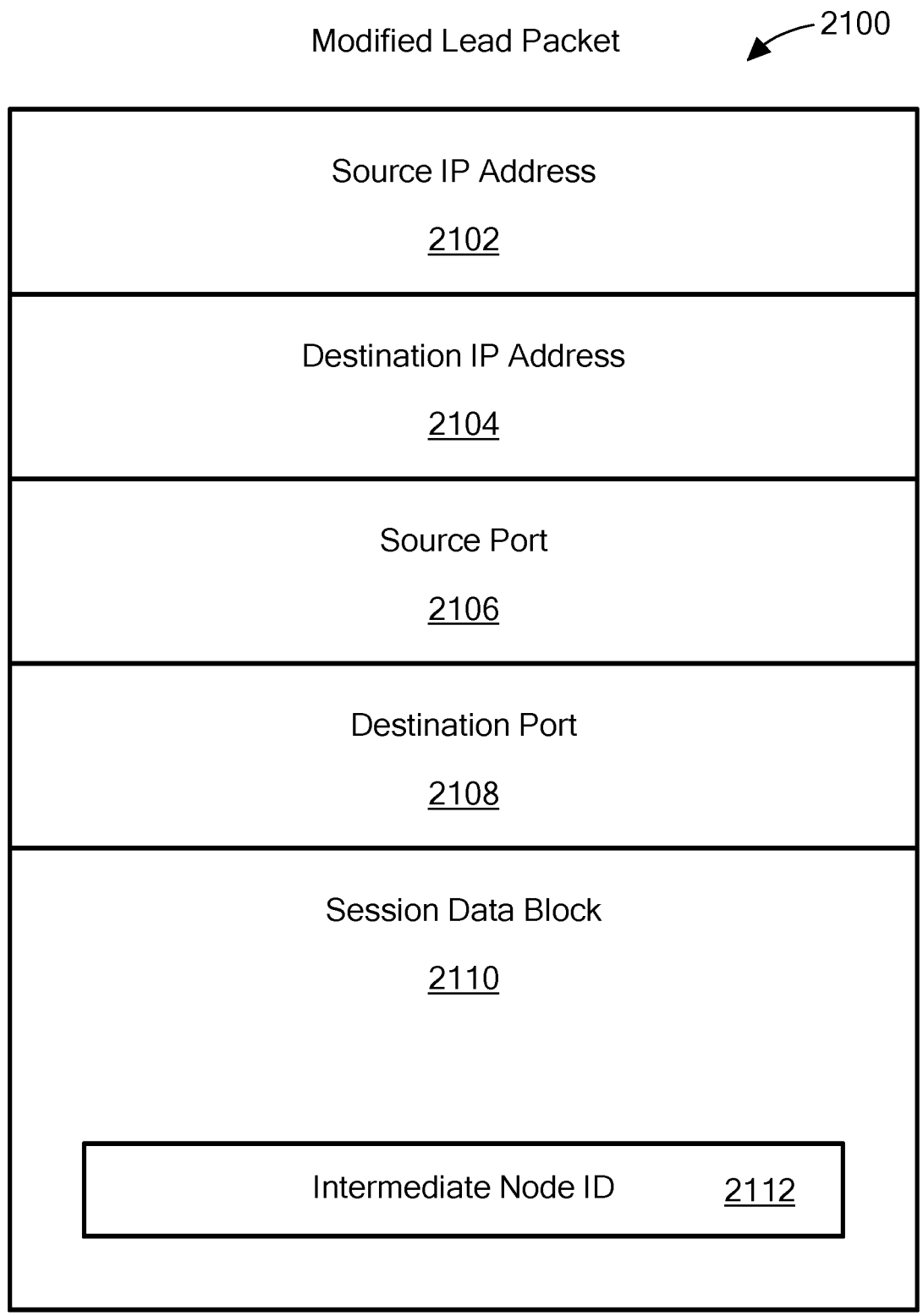
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000. The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
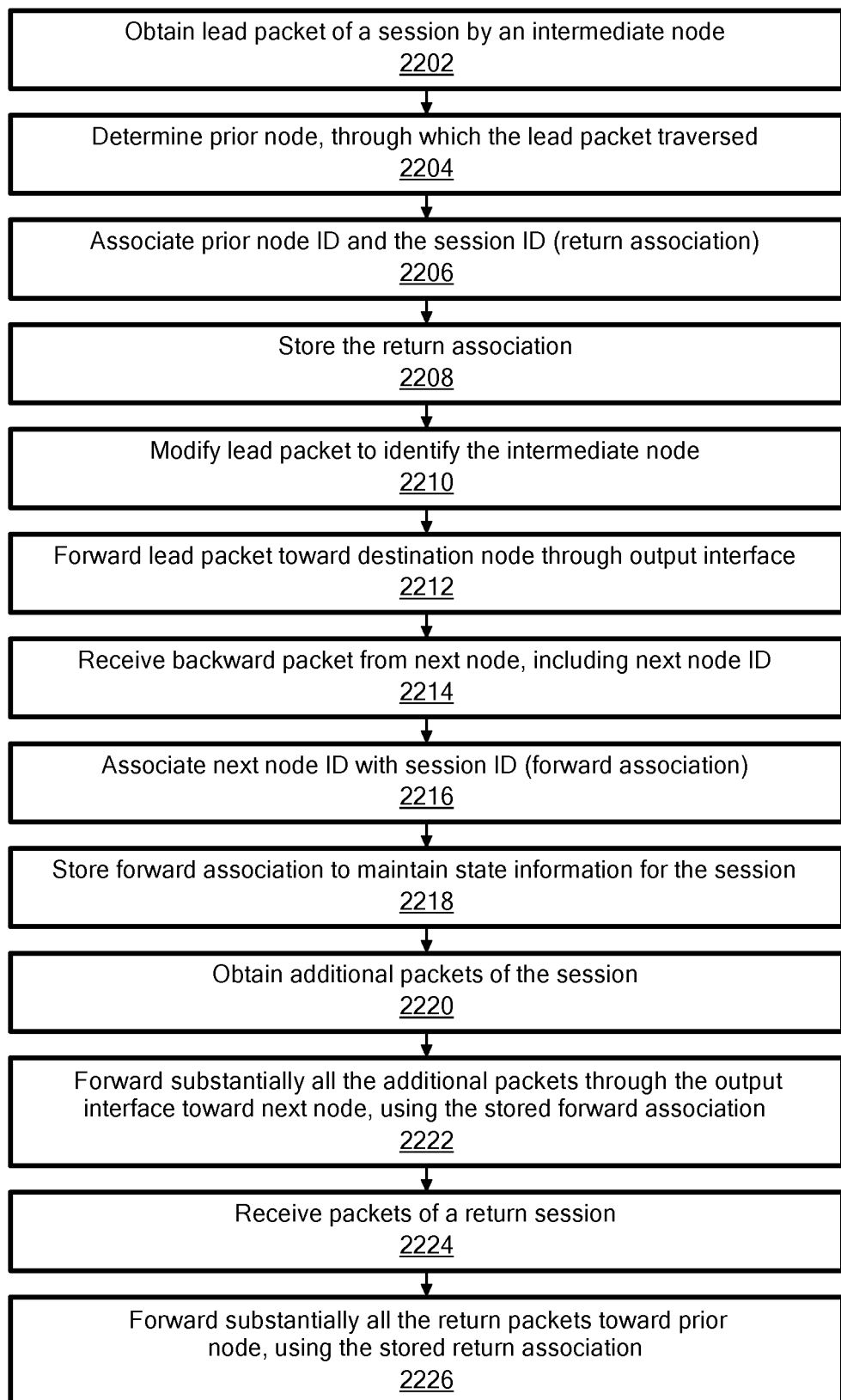
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
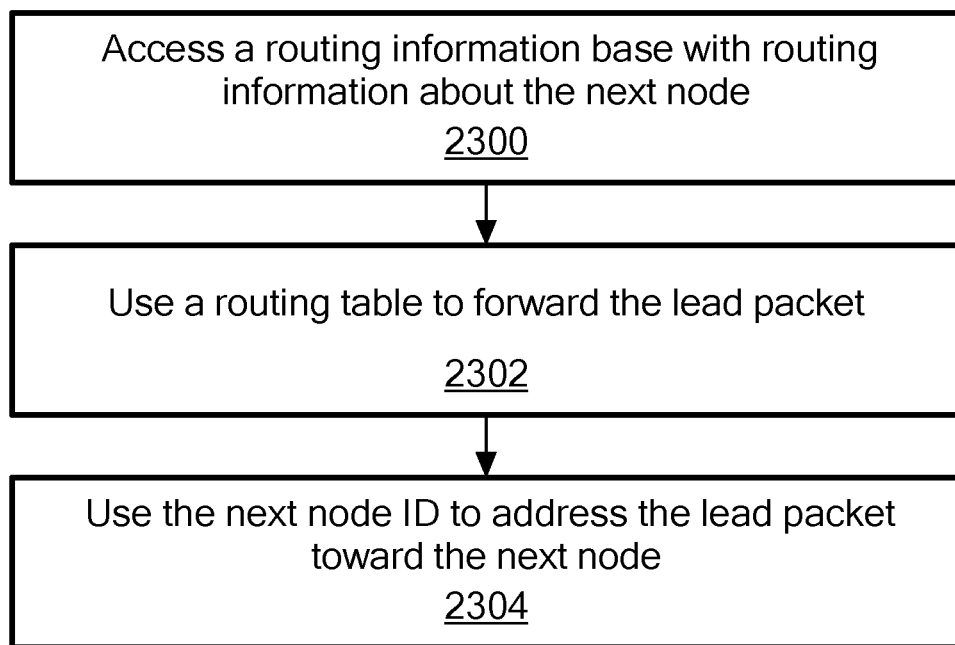
FIG. 23 is a flowchart illustrating some of the operations involved with forwarding a lead packet as part of the process of FIG. 22, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

Flow Modification

Because the communication system is dynamic, under some circumstances, it may become necessary or desirable for a router to modify a flow for a session that is associated with a particular ingress interface and egress interface. For example, under some circumstances, the router may modify the flow to be associated with a different egress interface (e.g., to forward packets received on the ingress interface via a different egress interface whether to the same downstream node or a different downstream node), while under other circumstances, the router may modify the flow to be associated with a different ingress port (e.g., if packets associated with the session/flow are routed by upstream nodes to a different ingress interface of the router). In exemplary embodiments, the router deactivates the existing flow for the session, sets up a new flow for the session while the existing flow is deactivated (during which time any packets received with respect to the existing flow may receive special handling, e.g., by directing the packets to the service path, buffering the packets until the new flow is activated, or dropping the packets), and then activates the new flow so that received packets can then be forwarded by the new flow.

Figure 24:
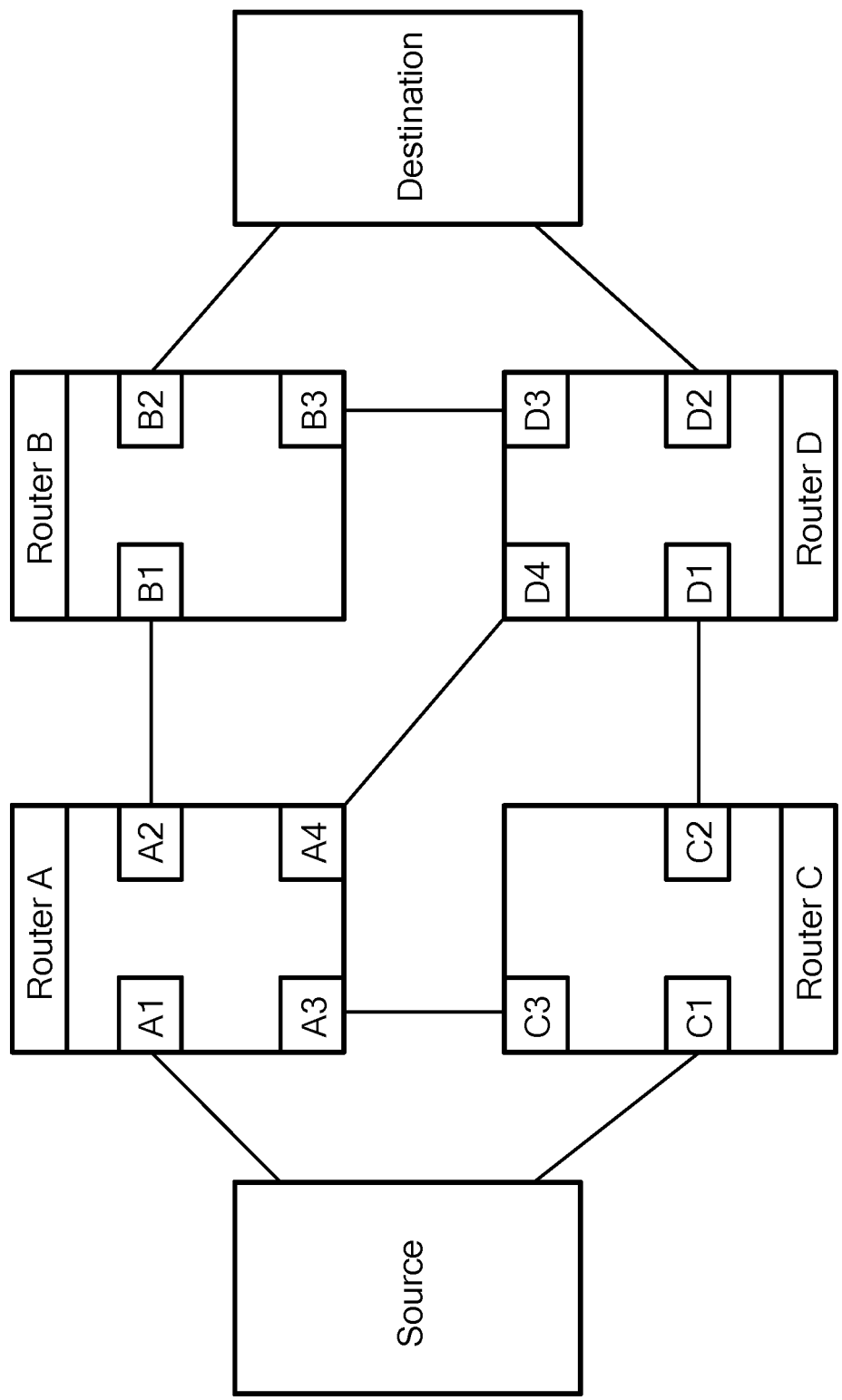
FIG. 24 is a schematic block diagram showing an exemplary communication system that is used herein to demonstrate various aspects of flow modification, in accordance with various embodiments of the present invention.

FIG. 24 is a schematic block diagram showing an exemplary communication system that is used herein to demonstrate various aspects of flow modification, in accordance with various embodiments of the present invention. The present invention is in no way limited to the exemplary communication system shown in FIG. 24 or to any particular communication system.

For the sake of the following discussion, it is assumed that the routers shown in FIG. 24 are all AIPRs. It should be noted that packets associated with a session may traverse one or more non-AIPR routers (not shown for convenience)

in addition to a particular set of AIPRs. Thus, for example, there may be one or more non-AIPR routers on any one of the "links" depicted between the AIPRs shown in FIG. 24.

In FIG. 24, there are multiple possible routes from the source node to the destination node through the various AIPRs. For example, packets potentially could be routed from the source node to the destination node using one of the following pathways:

Router A to Router B;
Router C to Router D;
Router A to Router D;
Router A to Router B to Router D;
Router A to Router C to Router D;
Router C to Router D to Router B; or
Router C to Router A to Router B.

As discussed above, certain exemplary embodiments employ "stateful" routing of packets associated with the session, specifically by forcing forward packets associated with the session to traverse a given set of AIPRs and optionally also by forcing reverse packets associated with the session to traverse a given set of AIPRs (which is generally, but not necessarily, the same set of AIPRs used for forward packets). Thus, each AIPR on the path generally will receive forward packets associated with the session over one specific router interface (referred to herein as the "ingress" interface for the session) and will route such forward packets out another router interface (referred to herein as the "egress" interface for the session.

As discussed above, each AIPR associated with the session includes special metadata in certain packets (e.g., the first packet associated with the session) when forwarding such packets to a downstream AIPR (i.e., an AIPR closer to the destination node along the route being established for the session). This metadata allows each AIPR associated with the session to establish and maintain session information for performing stateful routing as discussed above and also allows each AIPR to establish one or more "flows" for the session as discussed above, where each flow may include an action chain as discussed above. The flow(s) are used to route session packets from the ingress interface to the egress interface and optionally also from the egress interface to the ingress interface.

In certain exemplary embodiments, flows are established based on session information contained in the packet or added metadata (e.g., 5-tuple information) plus a VLAN identifier and interface identifier. For convenience, this set of information is referred to herein as a "7-tuple."

With reference again to FIG. 24, assume that a session between the source node and the destination node traverses Router A via interfaces A1 and A2 and also traverses Router B via interfaces B1 and B2. Thus, Router A has a "flow" between interface A1 (the "ingress" interface for packets sent by the source node to the destination node) and interface A2 (the "egress" interface for packets sent by the source node to the destination node). Similarly, Router B has a "flow" between interface B1 (the "ingress" interface for packets sent by the source node to the destination node) and interface B2 (the "egress" interface for packets sent by the source node to the destination node).

In certain exemplary embodiments, each AIPR maintains a flow configuration information record for each flow that it manages, where each flow is associated with a session. Thus, Router A maintains a flow configuration information record for the flow between interfaces A1 and A2 for the session, and Router B maintains a flow configuration information record for the flow between interfaces B1 and B2 for the session. The flow configuration information record generally allows for bi-directional packet forwarding within the router. Specifically, among other things, the flow configuration information record maintained by Router A may associate or map egress interface A2 with session packets received over ingress interface A1 and may associate or map ingress interface A1 with return session packets received over egress interface A2, and the flow configuration information maintained by Router B may associate or map egress interface B2 with session packets received over ingress interface B1 and may associate or map ingress interface B1 with return session packets received over egress interface B2.

In certain exemplary embodiments, the flow configuration information record for a packet received on an interface can be found using a set of information including session information associated with the packet (e.g., the 5-tuple information associated with the packet) plus a VLAN identifier and interface identifier (i.e., the "7-tuple").

When a packet arrives at an AIPR, the AIPR searches for an active flow configuration information record associated with the packet (e.g., based on the 7-tuple). If an active flow configuration information record is found, then the AIPR processes the packet according to the flow configuration information record, as discussed below. If an active flow configuration information record is not found for the packet, then "exception" processing is performed to determine how to handle the packet, as discussed below. Because the communication system is dynamic and can include non-AIPR routers, changes can occur in the communication system that require one or more AIPRs to modify the flow(s) associated with a given session. For example, a flow may need to be modified if packets associated with the flow arrive (or will begin to arrive) at the wrong interface or if an actual or impending routing change requires the ingress and/or egress interface to be changed. These and other scenarios are discussed below.

Flow Modification Due to Packet Arriving at Wrong Interface

Using the example shown in FIG. 24, assume that a session/flow associated with Router B involves ingress interface B1 and egress interface B2 such that the flow configuration information record associated with forward session packets received on interface B1 is used to forward the packets via egress interface B2. If a forward session packet is received on interface B3 (which could happen, for example, due to a routing change upstream from Router B, e.g., between Router A and Router B), then Router B is able to determine that the packet is associated with an existing session (e.g., using 5-tuple information) and also is able to determine that the packet was received on the wrong interface because there will be no flow configuration information record for the packet based on the session information plus VLAN and interface identifiers (e.g., 7-tuple information). However, Router B can locate the flow configuration information record for the existing session/flow associated with ingress interface B1 and egress interface B2 based on the session information associated with the packet, which shows that the packet was supposed to be received on interface B1 rather than interface B3.

In this case, Router B may, under certain conditions (e.g., either immediately or after a predetermined number of session packets are received on interface B3), switch the session to ingress interface B3. In certain exemplary embodiments, or under certain conditions, the egress interface for the session is required to be maintained (in this example, egress interface B2), although some embodiments may allow both the ingress interface and the egress interface to be changed under some conditions. In certain exemplary embodiments, Router B performs this switch by first deactivating the existing flow configuration information record associated with ingress interface B1 and egress interface B2, then setting up a new flow configuration information record to associate the session with ingress interface B3 and egress interface B2 (which can be done by modifying the existing flow configuration information record or by creating an entirely new flow configuration information record), and then activating the new flow configuration information record. Among other things, disabling the existing configuration information record associated with ingress interface B1 and egress interface B2 during the switching process will prevent any packets associated with the session received on interface B2 from being forwarded via interface B1 while the switch is occurring, and vice versa. Instead, session packets received on interface B2 may be buffered (at least temporarily) or may be dropped. Similarly, during the switching process, session packets received on interface B3 (including the packet that prompted the switch) may be buffered at interface B3 (at least temporarily) or may be dropped.

When the new flow configuration information record is activated, packet forwarding is resumed using the new flow configuration information record such that session packets are forwarded from ingress interface B3 to egress interface B2 and vice versa. If the original (now deactivated) flow configuration information record remains in Router B, then Router B may delete the record. In any case, at this time, if any session packets arrive at interface B1, there will be no active flow configuration information record associated with such packets. In this case, under certain conditions, Router B may perform the switching process again to switch the session from ingress interface B3 and egress interface B2 back to ingress interface B1 and egress interface B2. Thus, in certain exemplary embodiments, the routers modify flows as needed to favor the latest activity that matches the session.

Figure 25:
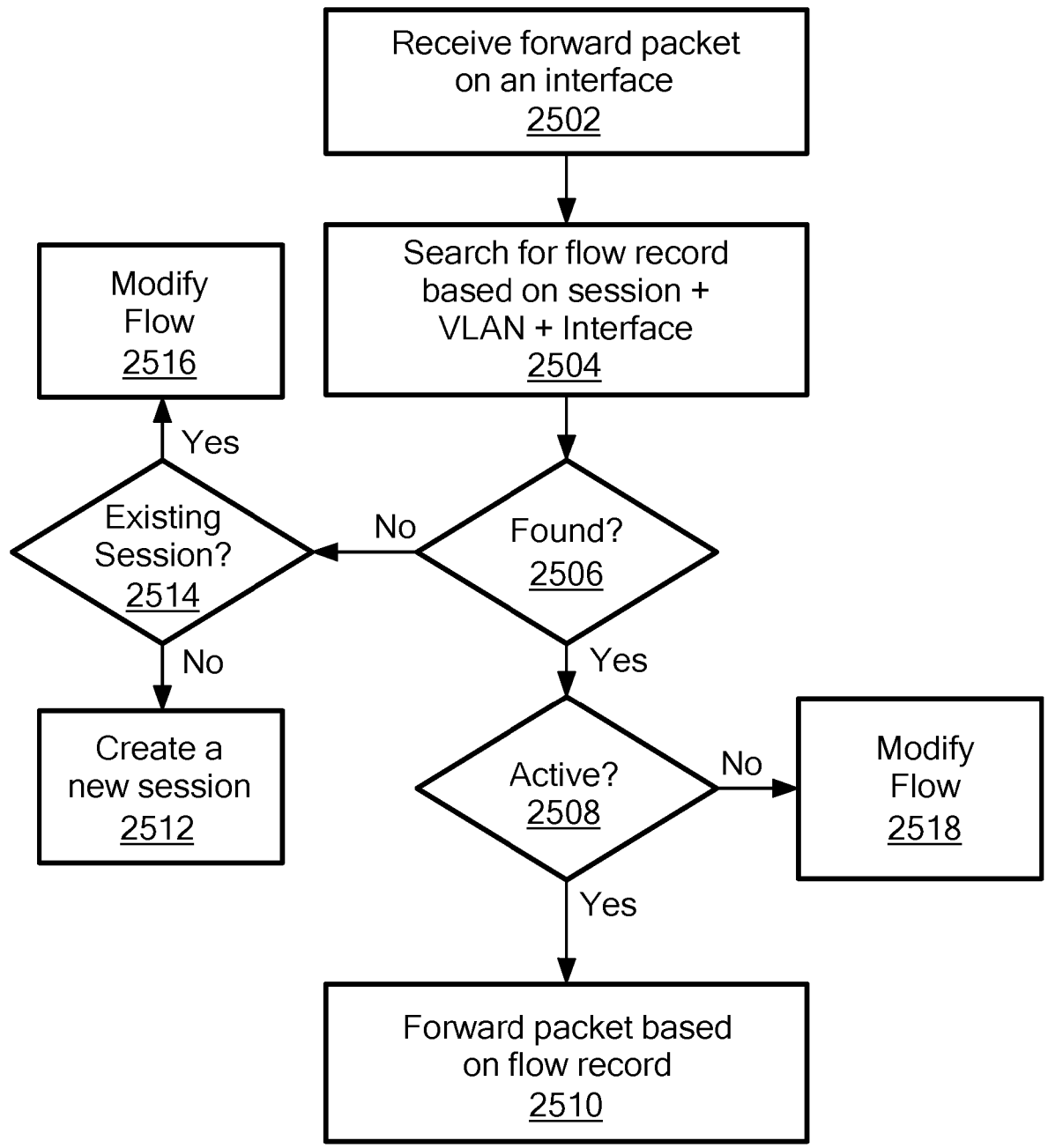
FIG. 25 is a logic diagram for flow modification due to a packet arriving at the wrong interface, in accordance with one exemplary embodiment.

FIG. 25 is a logic diagram for flow modification due to a packet arriving at the wrong interface, in accordance with one exemplary embodiment. In block 2502, the router receives a forward packet on an interface. In block 2504, the router searches for a flow configuration information record for the packet based on session information (e.g., the 5-tuple information) plus VLAN and interface identifiers. If a flow configuration information record is found (YES in block 2506) and the flow configuration information record is active (YES in block 2508), then the router forwards the packet based on the flow configuration information record, in block 2510. If a flow configuration information record is found (YES in block 2506) but the flow configuration information record is inactive (NO in block 2508), then the router modifies the flow in block 2518. If a flow configuration information record is not found (NO in block 2506), then the router determines if the packet is associated with an existing session, in block 2514. If the packet is associated with an existing session (YES in block 2514), then the router is able to determine that the packet was received on the wrong interface and therefore the router modifies the flow, in block 2516. If, however, the packet is not associated with an existing session (NO in block 2514), then the router establishes a new session/flow for the packet in block 2512 (e.g., if the packet contains session metadata from another AIPR as discussed herein) or may involve routing the packet via a traditional routing protocol.

Figure 26:
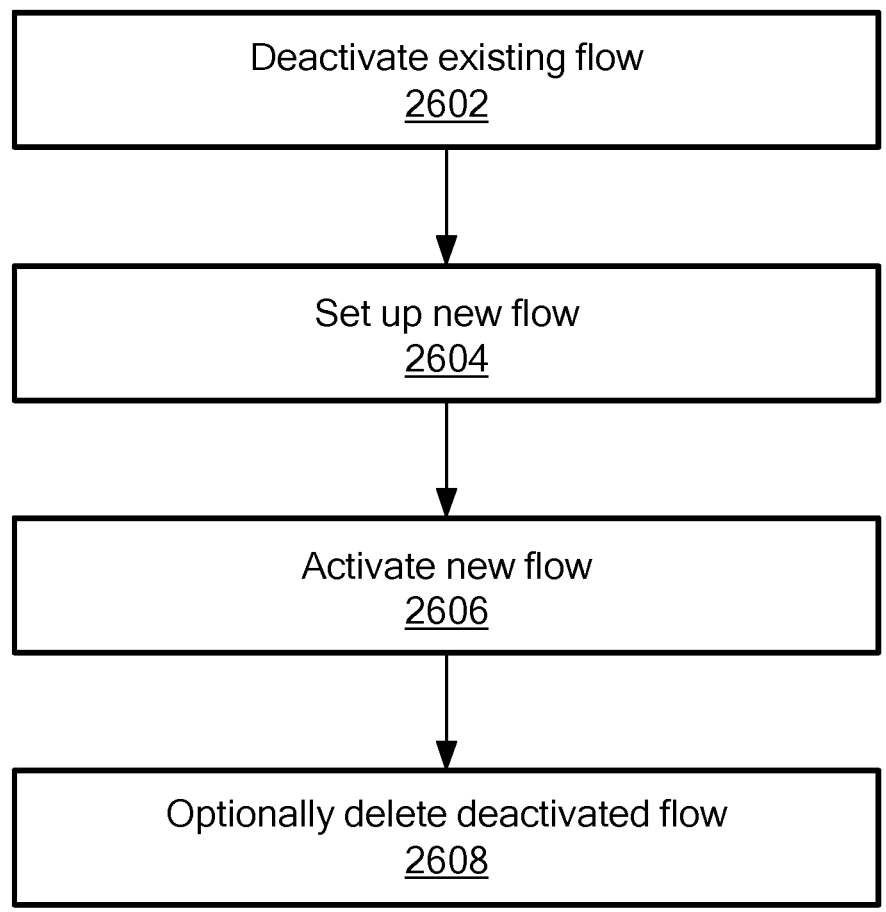
FIG. 26 is a logic diagram for modifying a flow in block 2516, in accordance to one exemplary embodiment.

FIG. 26 is a logic diagram for modifying a flow in block 2516, in accordance to one exemplary embodiment. In block 2602, the router deactivates the existing flow for the session. In block 2604, the router sets up a new flow for the session, which can be done by modifying the existing flow or by creating an entirely new flow. In block 2606, the router activates the new flow. In block 2608, the router optionally deletes the deactivated flow.

Figure 32:
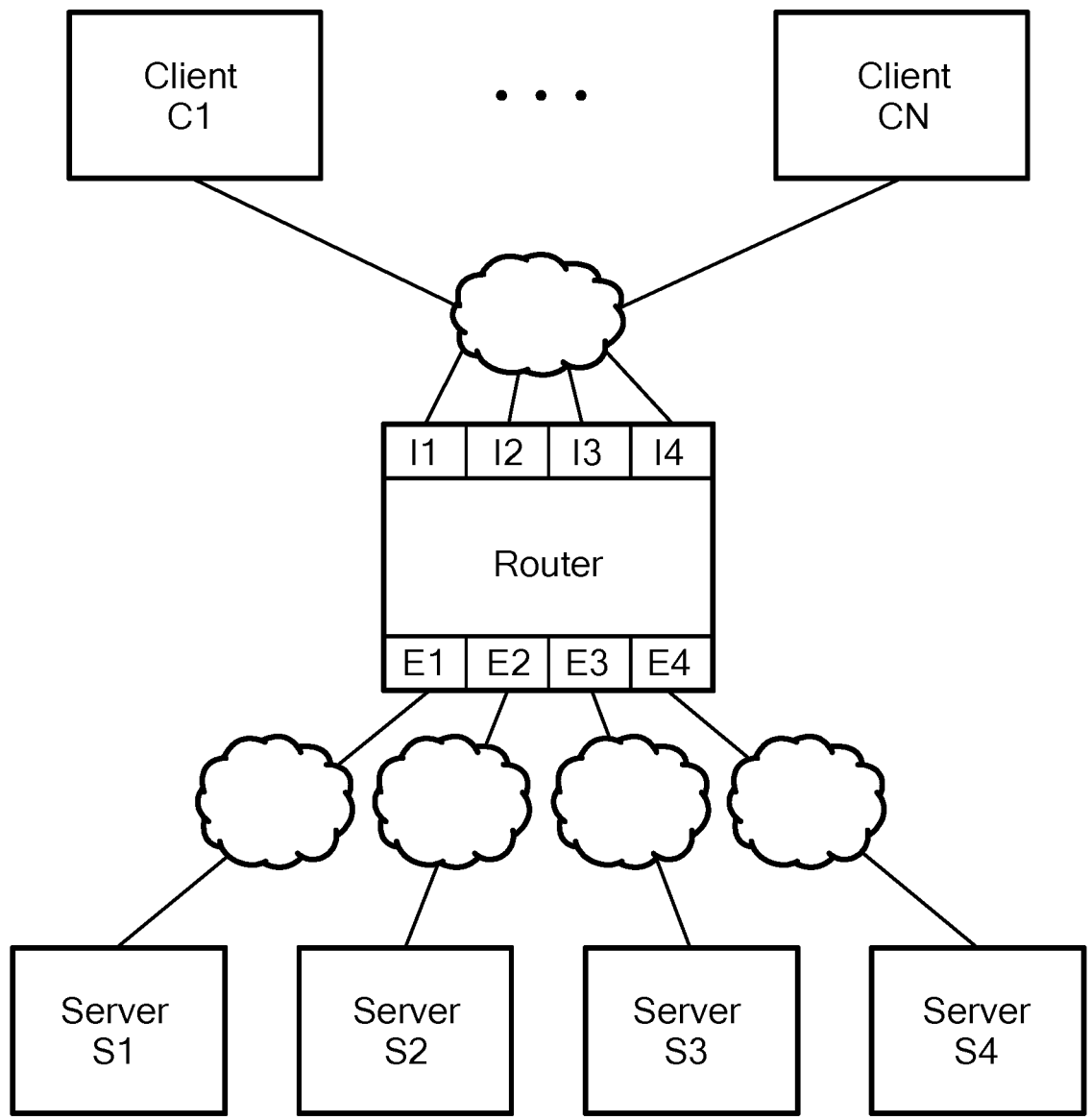
FIG. 32 is a schematic diagram showing a load-sharing network configuration, in accordance with one exemplary embodiment.

As mentioned above, in certain exemplary embodiments, or under certain conditions, the egress interface for the session is required to be maintained when session packets arrive at the wrong interface. One situation where such egress interface enforcement may be necessary or desirable is in load-sharing across a number of servers. FIG. 32 is a schematic diagram showing a load-sharing network configuration, in accordance with one exemplary embodiment. Here, four servers (S1, S2, S3, S4) are available to process requests from the Client. Each server is accessible through a different egress interface of the Router (e.g., Server S1 is accessible through egress interface E1, Server S2 is accessible through egress interface E2, Server S3 is accessible through egress interface E3, and Server S4 is accessible through egress interface E4). The Router is configured to load-share requests from multiple clients (C1-CN) across the four servers, e.g., in a round-robin fashion. Thus, for example, a first client C1 may be routed to Server S1, a second client C2 may be routed to Server S2, a third client C3 may be routed to Server S3, a fourth client C4 may be routed to Server S4, a fifth client C5 may be routed to Server S1, etc. The Router establishes appropriate flows for each session, e.g., a flow for client C1 between ingress interface I1 and egress interface E1, a flow for client C2 between ingress interface I3 and egress interface E2, etc. Now, assume that packets associated with the client C1 session begin to arrive at ingress interface I2 rather than original ingress interface I1. Using the mechanisms described above, the Router is able to identify that the packets are associated with the client C1 session but are arriving on the wrong interface. The Router therefore is able to modify the flow to switch the session to ingress interface I2. In order to maintain session continuity and enforce the initial load balancing decision, the Router maintains the session on egress interface E2.

Flow Modification Due to Routing Change

As discussed above, AIPRs and other routers generally run a routing protocol in order to determine routes to be used between various nodes in the communication system. Using the routing protocol, the routers exchange information that allows each router to identify other routers in the communication system (e.g., adjacent routers) and allows the routers to determine routes through the routers. Each router establishes forwarding information (sometimes referred to as a "forwarding information base" or FIB) that specifies parameters for forwarding packets. For example, in a simple case, a router may forward packets based on the destination IP address of the packet, where the FIB specifies the desired output port for the packet based on the destination IP address of the packet. As discussed above, AIPRs generally forward packets using a flow configuration information record that is based on session information in addition to VPN and interface identifiers (e.g., the 7-tuple). In this respect, the flow configuration information record may be considered to be part of the FIB of the AIPR.

Additionally, in certain exemplary embodiments, AIPRs and other routers also utilize the Bidirectional Forwarding Detection (BFD) protocol to monitor communication links to adjacent devices, as discussed above. The BFD protocol is described in IETF RFC 5880, which is hereby incorporated herein by reference in its entirety. In many cases, the BFD protocol can detect the failure of a communication link before the routing protocol detects the failure, so, in some situations, the BFD protocol can provide advanced warning to the router that a routing change is needed or is forthcoming. Some alternative uses are discussed in 4094/1018, which was incorporated by reference above.

Thus, from time to time, using the routing protocol or BFD, an AIPR may determine that a flow needs to be modified. This can happen, for example, due to failure of a router, failure of a communication link between two routers, congestion on a communication link between two routers, or other types of communication network changes.

Using the example shown in FIG. 24, assume that a session/flow associated with Router B involves ingress interface B1 and egress interface B2 such that the flow configuration information record associated with session packets received on interface B1 is used to forward the packets via egress interface B2. Now assume that Router B determines, using the routing protocol, that packets associated with the session now should be forwarded from ingress interface B1 to egress interface B3. This might happen, for example, if Router B determines that the communication link between interface B2 and the destination node has failed.

In this case, Router B may switch the session from ingress interface B1 and egress interface B2 to ingress interface B1 and egress interface B3. In certain exemplary embodiments, as discussed above, Router B performs this switch by first deactivating the existing flow configuration information record associated with ingress interface B1 and egress interface B2, setting up a new flow configuration information record to associate the session with ingress interface B1 and egress interface B3 (which can be done by modifying the existing flow configuration information record or by creating an entirely new flow configuration information record), and activating the new flow configuration information record. Among other things, disabling the existing configuration information record associated with ingress interface B1 and egress interface B2 during the switching process will prevent any packets associated with the session received on interface B2 from being forwarded via interface B1 while the switch is occurring and vice versa. Instead, session packets received on interface B2 may be buffered at interface B2 (at least temporarily) or may be dropped.

When the new flow configuration information record is activated, packet forwarding is resumed using the new flow configuration information record such that session packets are forwarded from ingress interface B1 to egress interface B3 and vice versa. If the original (now deactivated) flow configuration information record remains in Router B, the Router B may delete the record. In any case, at this time, if any session packets arrive at interface B2, there will be no active flow configuration information record associated with such packets.

One issue with switching the session from ingress interface B1 and egress interface B2 to ingress interface B1 and egress interface B3 is that egress interface B3 will route session packets to Router D, which was not previously involved with the stateful routing of packets associated with the session. Thus, Router D will not have any information for the session and will not have a flow established to forward packets from ingress interface D3 (over which session packets will be received from interface B3 of Router B) to egress interface D2 (over which session packets will be forwarded to the destination node).

Therefore, in certain exemplary embodiments, Router B inserts session metadata (e.g., including a 5-tuple of information for the session) in at least the first packet it forwards to Router D over egress interface B3, e.g., substantially as described above. Typically, Router B is aware that Router D is an AIPR and therefore supports such metadata, although in some exemplary embodiments, Router B may not be aware that Router D is an AIPR but still may insert such session metadata into the packet. The metadata allows Router D to set up a flow configuration information record for the session between ingress interface D3 and egress interface D2 for stateful routing, as discussed above. Thus, when new flow is activated, the next packet that reaches the flow is essentially treated as a first packet and is attached to the same session as that of the original flow. For consistency, metadata also can be included in the first packet following activation of the new flow when a flow is modified due to receipt of a session packet at the wrong interface as discussed above.

In the example communication system shown in FIG. 24, there is no next-hop downstream AIPR coupled to interface B2 and there is no next-hop downstream AIPR coupled to interface D2. However, if there happened to be a downstream AIPR coupled to interface B2, then, in certain exemplary embodiments, that AIPR would stop receiving session packets and eventually the flow configuration information record associated with the session in such downstream AIPR would time-out and be deleted. Also, if there happened to be a downstream AIPR coupled to interface D2, then, in certain exemplary embodiments, Router D would include session metadata in at least the first session packet it forwards to such downstream AIPR to allow the downstream AIPR to allow that AIPR to set up a flow configuration information record for stateful routing, and each successive downstream AIPR would include session metadata as needed to propagate the session information from AIPR to AIPR along the new path.

Figure 27:
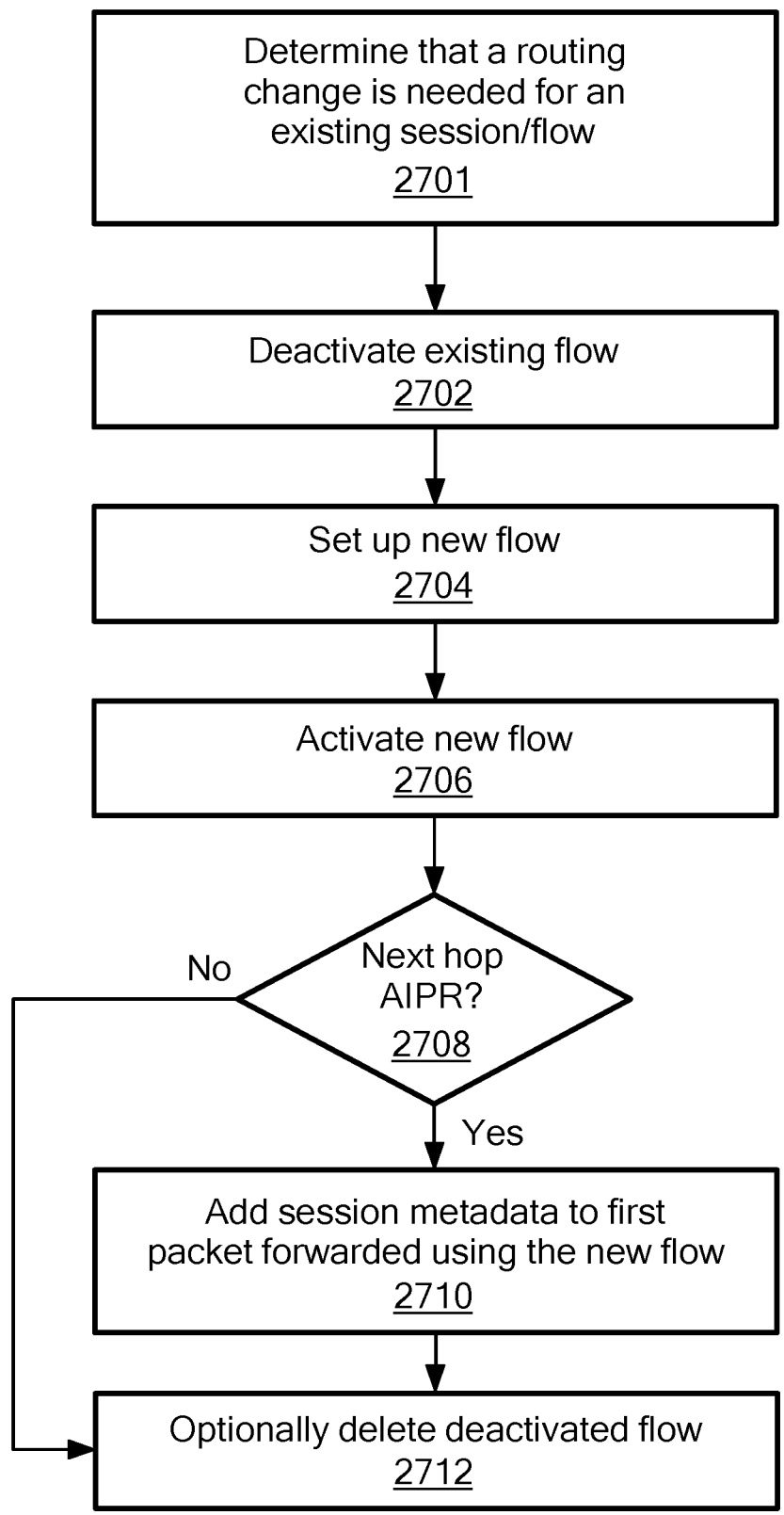
FIG. 27 is a flowchart for flow modification due to a routing protocol change, in accordance to one exemplary embodiment.

FIG. 27 is a flowchart for flow modification due to a routing protocol change, in accordance to one exemplary embodiment. In block 2701, the router determines that a routing change is needed for an existing session/flow, e.g., a routing change to a new egress interface. In block 2702, the router deactivates the existing flow for the session. At this point, any packets that match this (deactivated) flow will receive special handling, which, in certain exemplary embodiments, involves the service path holding such packets until a new flow is set up and activated. In block 2704, the router sets up a new flow for the session, which can be done by modifying the existing flow or by creating an entirely new flow. In block 2706, the router activates the new flow. At this point, any session packets being held can be injected into this new flow to be forwarded. In block 2708, the router determines if there is a next-hop downstream AIPR, and if so (YES in block 2708), the router adds session metadata to at least the first packet that it forwards using the new flow, in block 2710 (in some exemplary embodiments, the router may add session metadata regardless of whether there is a next hop AIPR). In any case, the router optionally deletes the deactivated flow configuration information record, in block 2712.

Figure 28:
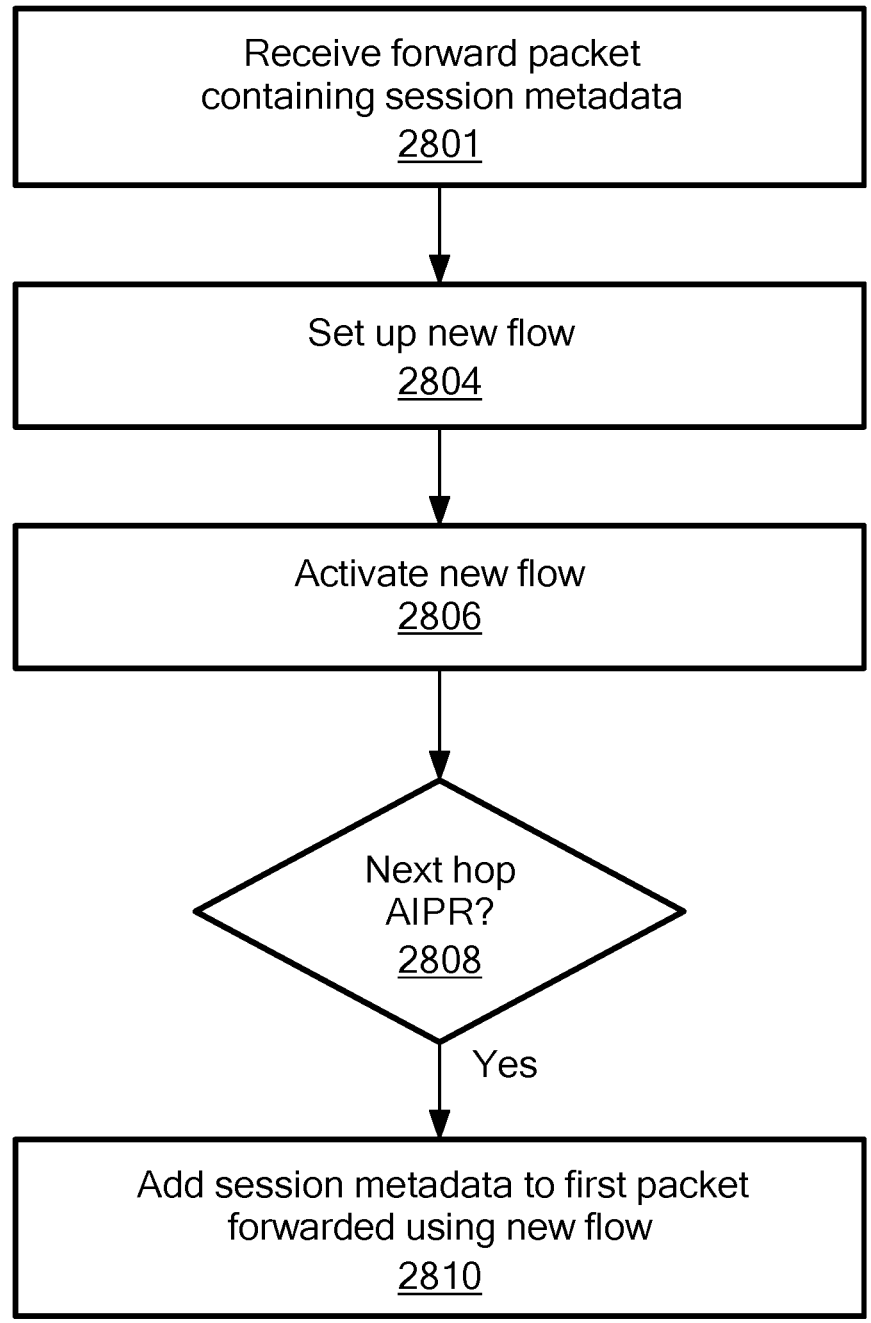
FIG. 28 is a flowchart for processing of a forwarded packet following a routing change, in accordance to one exemplary embodiment.

FIG. 28 is a flowchart for processing of a forwarded packet following a routing change, in accordance to one exemplary embodiment. In block 2801, the router receives a forward packet containing session metadata for an unsupported session. In block 2804, the router sets up a new flow configuration information record for the session/flow. In block 2806, the router activates the new flow configuration information record. In block 2808, the router determines if there is a next-hop downstream AIPR, and if so (YES in block 2808), the router adds session metadata to at least the first packet that it forwards using the new flow, in block 2810 (in some exemplary embodiments, the router may add session metadata regardless of whether there is a next hop AIPR).

Flow Modification Due to Communication Link Failure

As discussed herein, AIPRs and other routers often utilize the Bidirectional Forwarding Detection (BFD) protocol to monitor communication links to adjacent devices, as discussed above, although routers can monitor communication links and detect link failure in other ways, such as, for example, based on link-layer communications or exchanges of so-called "hello" or "ping messages." In many cases, the BFD protocol can detect the failure of a communication link before the routing protocol detects the failure, so, in some situations, the BFD protocol can provide advanced warning to the router that a routing change is needed or is forthcoming. Some alternative uses are discussed in 4094/1018, which was incorporated by reference above.

Using the example shown in FIG. 24, assume that a session/flow associated with Router B involves ingress interface B1 and egress interface B2 such that the flow configuration information record associated with forward session packets received on interface B1 is used to forward the packets via egress interface B2. Now assume the router, using BFD or another link monitoring scheme, determines that the link associated with ingress interface B1 has failed. At some point, the router will take steps to recover from the link failure and establish a new flow associated with a new ingress interface (and optionally also a new egress interface), e.g., when packets start arriving at a different ingress interface or by performing a routing change, as discussed above. However, in certain exemplary embodiments, the router instead may initiate recovery from the link failure upon detecting the link failure (e.g., as opposed to waiting for the routing protocol to initiate recovery) and may immediately deactivate the existing flow associated with the session. Among other things, deactivating the existing flow generally will force the router to perform special processing on any packets received for the flow, e.g., by the service path, while the router is establishing a new flow.

Similarly, assume instead that the router, using BFD or another link monitoring scheme, determines that the link associated with egress interface B2 has failed. Again, at some point, the router will take steps to recover from the link failure and establish a new flow to a new egress interface, e.g., by performing a routing change, as discussed above. However, in certain exemplary embodiments, the router instead may initiate recovery from the link failure upon detecting the link failure (e.g., as opposed to waiting for the routing protocol to initiate recovery) and may immediately deactivate the existing flow associated with the session. Among other things, deactivating the existing flow generally will force the router to perform special processing on any packets received for the flow, e.g., by the service path, while the router is establishing a new flow.

Flow Modification Due to Message Collision

In certain situations, two nodes may transmit packets to one another, where a packet heading in one direction reaches a particular router before the packet heading in the other direction reaches the router. Thus, the router might establish flows for the session based on the first packet received and might then have to modify the flows when the second packet is received, particularly in exemplary embodiments that modify flows as needed to favor the latest activity that matches the session (in this example, the second packet to reach the router is the latest activity that matches the session). The flow modification may be handled substantially as described above with regard to a session packet arriving at the wrong interface.

The following is an example of flow modification due to message collision. Assume the communication system includes a first endpoint node (1.1.1.1) and a second endpoint node (4.4.4.4) in communication through two routers (2.2.2.2) and (3.3.3.3). Also assume that there valid routes in both directions, i.e., there is a valid route from Endpoint1 to Endpoint 2 via Router1 and Router2 and a valid route from Endpoint2 to Endpoint 1 via Router2 and Router1.

Assume the following packet (Packet A) is sent from Endpoint1 to Endpoint2:

| | |
|---|---|
| SA | 1.1.1.1 |
| SP | 3000 |
| DA | 4.4.4.4 |
| DP | 7000 |

At around the same time, assume the following packet (Packet B) is sent from Endpoint2 to Endpoint1:

| | |
|---|---|
| SA | 4.4.4.4 |
| SP | 7000 |
| DA | 1.1.1.1 |
| DP | 3000 |

In the context of stateful routing as described herein, Packet A and Packet B contain the same session information.

Assume Packet A reaches Router1, which selects Router2 as the next-hop router for the session, establishes the session and associated flows based on Packet A, and sends the following packet (Packet C) to Router2:

| | |
|---|---|
| SA | 2.2.2.2 |
| SP | 16346 |
| DA | 3.3.3.3 |
| DP | 16345 |
| (Session Metadata) | |

Now, assume Packet B reaches Router2 before Packet C reaches Router2. Router2 selects Router1 as the next-hop for the session, establishes a session and associated flows based on Packet B, e.g., a forward flow for packets from Endpoint2 to Endpoint1 (say, interface 2, source address 4.4.4.4, source port 7000, destination address 2.2.2.2, destination port 3000) and a reverse flow for return packets from Endpoint1 to Endpoint2 (say, interface 1, source address 2.2.2.2, source port 17000, destination address 3.3.3.3, destination port 17001), and sends a modified packet (Packet D) to Router 1.

When Packet C arrives at Router2, Router2 detects a collision based on the metadata, i.e., Router2 detects that Packet C matches the existing session but in the reverse direction (even though Packet C is going in the "forward" direction with respect to Endpoint1 initiating the transmission). Thus, Router2 modifies its reverse flow for the session (i.e., for packets transmitted by Endpoint1 to Endpoint 2) based on the information in Packet C, e.g., by installing a new reverse flow (say, interface 1, source address 2.2.2.2, source port 16346, destination address 3.3.3.3, destination port 16345) and marking the old reverse flow for deletion. Among other things, this flow modification maintains Router2's forward flow so that any session packets that arrive from Endpoint2 can be forwarded. Packet C is forwarded based on the new flow.

When Packet D arrives at Router 1, Router 1 performs a similar flow modification to its reverse flow for the session based on Packet D.

Figure 33:
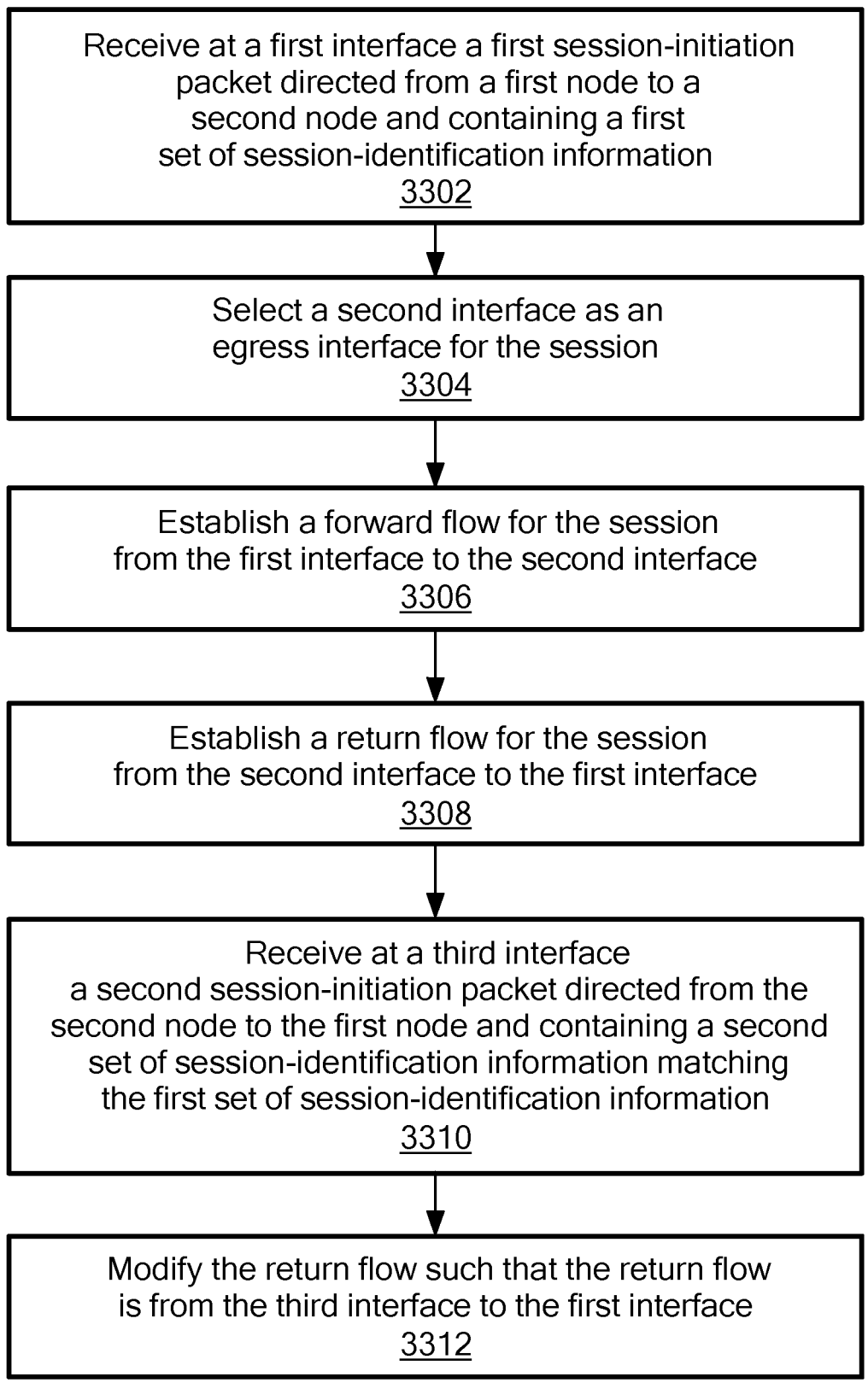
FIG. 33 is a flowchart for flow modification due to a message collision, in accordance with one exemplary embodiment

FIG. 33 is a flowchart for flow modification due to a message collision, in accordance with one exemplary embodiment. In block 3302, the router receives at a first interface a first session-initiation packet directed from a first node to a second node and containing a first set of session-identification information. In block 3304, the router selects a second interface as an egress interface for the session. In block 3306, the router establishes a forward flow for the session from the first interface to the second interface. IN block 3308, the router establishes a return flow for the session from the second interface to the first interface. At this point, the router is prepared to forward session packets from the first node to the second node and from the second node to the first node. In block 3310, the router receives at a third interface a second session-initiation packet directed from the second node to the first node and containing a second set of session-identification information matching the first set of session-identification information. In block 3312, the router modifies the return flow such that the return flow is from the third interface to the first interface. In this way, session packets from the first node to the second node can continue to be forwarded using the forward flow while session packets from the second node to the first node can be forwarded using the modified return flow. Any session packet from the second node to the first node that arrive at the second interface, which is now blocked with respect to the session, can be forwarded by the router via the modified return flow.

Flow Modification Due to Network Configuration

In certain situations, an AIPR might install an initial flow for a session and subsequently determine that the flow needs to be modified upon learning additional information regarding the network configuration (or a change in the network configuration).

For example, an AIPR might install an initial flow for a session and later determine that there is a source network address translator (NAT) device on a communication link such that a flow needs to be modified. As discussed in 4094/1018, which is hereby incorporated by reference, AIPRs may detect the presence or absence of source NAT on incoming and/or outgoing communication links using a link monitoring protocol in which link monitoring protocol messages exchanged by the AIPRs include special metadata that allows each AIPR to determine the status of source NAT on communication links to and/or from the other AIPR (e.g., if source NAT is present on the communication link, or if there is a change in source NAT configuration, e.g., from enabled to disabled, from disabled to enabled, or from one translation to another translation), and also allows true source information (e.g., source address and source port number) to be conveyed between AIPRs even in the presence of source NAT. In certain exemplary embodiments, the link monitoring protocol is the Bidirectional Forwarding Detection (BFD) protocol described in IETF RFC 5880, which is hereby incorporated herein by reference in its entirety, with special metadata carried in BFD packets. For convenience, such use of the BFD protocol with added metadata may be referred to herein as "augmented BFD." It should be noted, however, that special metadata of the type described herein could be used in conjunction with other types of link monitoring protocol messages (e.g., "Hello" messages, "Ping" messages, "Keep-Alive" messages, certain routing protocol messages, etc.) for source NAT detection.

In certain specific exemplary embodiments, the source NAT detection metadata includes two sets (or "tuples") of information, namely a set of "expected" address/port information and a set of "actual" address/port information, where each set includes a source address, a source port number, a destination address, and a destination port number. An AIPR (node) configures the set of "expected" address/port information to be the address/port information it expects to see in messages sent from the other node and configures the set of "actual" address/port information to be the address/port information it actually receives in messages sent from the other node. In the context of stateful routing as discussed above, the set of "expected" address/port information is essentially session identification information that is included in messages by both nodes.

Thus, in certain specific exemplary embodiments, two nodes (referred to for convenience as Node N1 and Node N2) exchange messages having the following format:

| Header | |
|---|---|
| SA/SP | (source address/source port number) |
| DA/DP | (destination address/destination port number) |
| Metadata | |
| Exp SA/SP | (expected source address/source port number) |
| Exp DA/DP | (expected destination address/destination port number) |
| Act SA/SP | (actual source address/source port number) |
| Act DA/DP | (actual destination address/destination port number) |

The header portion contains a "tuple" of actual address/port information used to route the message from the sending node to the receiving node. In this example, Node N1 addresses messages to Node N2 using appropriate address/port numbers, and Node N2 addresses message to Node N1 using appropriate address/port numbers. The source address and/or source port number in the header field are subject to being translated by a source NAT on the outgoing communication link from the sending node to the receiving node. Thus, the header information received by the receiving node may be different than the header information transmitted by the sending node.

The "expected" metadata contains a "tuple" specifying address/port information that the sending node expects to receive back in the header portion of messages received from the other node assuming no source NAT in either direction. Thus, in this example, Node N1 configures the "expected" metadata in messages it sends to Node N2 to be the address/port information it expects to receive from Node N2, and Node N2 configures the "expected" metadata in messages it sends to Node N1 to be the address/port information it expects to receive from Node N1. In certain exemplary embodiments, the "expected" metadata sent by Node N1 and the "expected" metadata sent by Node N2 includes a common set of session identification information, which are essentially "swapped" versions of one another, as described below.

The "actual" metadata contains a "tuple" specifying the actual address/port information that the sending node received in the header portion of the last message it received from the other node.

Each node stores a local copy of the last header information tuple it received from the other node and a local copy of the last "actual" metadata tuple it received from the other node.

When a node receives a message, if can determine if there is source NAT (or any change in source NAT status) on both the incoming communication link and the outgoing communication link, based on the information in the received messages and the local copies of information. Specifically, the node can determine if there is source NAT or a change in source NAT status on the incoming communication link by comparing the header information tuple in the received message with the local copy of the last header information received tuple—if the tuples are different, then there has been a change in source NAT status on the incoming communication link. Also, the node can determine if there is source NAT or a change in source NAT status on the outgoing communication link by comparing the "actual" metadata tuple in the received message with the local copy of the last "actual" information received tuple—if the tuples are different, then there has been a change in source NAT status on the outgoing communication link. If there has been a change in source NAT status on the incoming communication link and/or the outgoing communication link, then the node can determine the type of change (e.g., whether source NAT was enabled, disabled, or changed from one translation to another translation) based on the received information, the local copies, and the expected session identification information.

Thus, when a node receives a link monitoring protocol message containing a header, expected metadata, and actual metadata from another node, the node compares received header information with a local copy of last header information received to determine the source NAT status on the incoming communication link. The node also compares received actual metadata with a local copy of last actual metadata received to determine the source NAT status on the outgoing communication link. The node updates its local copies of last header information received and last actual metadata received based on the received link monitoring protocol message. The node optionally updates session-based information and flows based on any changes in source NAT status. The node formats a return link monitoring protocol message containing a return header, return expected metadata, and return actual metadata including header information from the received link monitoring protocol message. The node transmits the return link monitoring protocol message to the other node, which performs the same source NAT detection process to determine the source NAT status on its incoming and outgoing communication links.

The following provides an example of a source NAT detection protocol exchange when there is source NAT on both the communication link from a first node (referred to in this example as Node N1) to a second node (referred to in this example as Node N2) and the communication link from Node N2 to Node N1, in accordance with one exemplary embodiment.

Node N1 (which is associated with a fictitious network address 1.1.1.1) transmits an initial link monitoring protocol message addressed to Node N2 (which is associated with a fictitious network address 2.2.2.2). Specifically, the message includes a header portion and a metadata portion, as follows:

| Header | |
| --- | --- |
| SA/SP | 1.1.1.1/1281 |
| DA/DP | 2.2.2.2/1280 |
| Metadata | |
| Exp SA/SP | 2.2.2.2/1280 |
| Exp DA/DP | 1.1.1.1/1281 |

| -continued | |
| --- | --- |
| Act SA/SP | 2.2.2.2/1280 |
| Act DA/DP | 1.1.1.1/1281 |

The metadata included by Node N1 includes an expected ("Exp") metadata tuple that reflects the original address/port information that Node N1 expects to receive back from Node N2 (assuming no source NAT device is present on the communication link from Node N1 to Node N2). Node N1 also includes an actual ("Act") metadata tuple that in this exemplary embodiment is initially the same as the "expected" metadata tuple (since there was no previous message received by Node N1 from Node N2). Node N1 stores the original address/port information, e.g., as part of its session-related data for stateful routing as discussed above, and may set up initial flows based on the original address/port information. Node N1 also stores a local copy of the expected header information and a local copy of the expected "actual" metadata. Thus, for example, Node N1 may store the following local copies:

| Node N1 LAST HEADER INFORMATION RECEIVED | |
| --- | --- |
| SA/SP | 2.2.2.2/1280 |
| DA/DP | 1.1.1.1/1281 |
| Node N1 LAST ACTUAL METADATA RECEIVED | |
| Act SA/SP | 1.1.1.1/1281 |
| Act DA/DP | 2.2.2.2/1280 |

Thus, Node N1 essentially initializes its LAST HEADER INFORMATION RECEIVED tuple to be the tuple it would expect to receive from Node N2 if there is no source NAT on the incoming communication link from Node N2 to Node N1 and initializes its LAST ACTUAL METADATA RECEIVED tuple to be the information it would expect to receive from Node N2 if there is no source NAT on the outgoing communication link from Node N1 to Node N2.

In this example, there is source NAT on the communication link from Node N1 to Node N2. Therefore, Node N2 may receive the following message including translated source information, as follows:

| Header | |
| --- | --- |
| SA/SP | 3.3.3.3/1381 |
| DA/DP | 2.2.2.2/1280 |
| Metadata | |
| Exp SA/SP | 2.2.2.2/1280 |
| Exp DA/DP | 1.1.1.1/1281 |
| Act SA/SP | 2.2.2.2/1280 |
| Act DA/DP | 1.1.1.1/1281 |

Specifically, source address 1.1.1.1 has been translated to 3.3.3.3 and source port number 1281 has been translated to 1381.

Upon receipt of this message, Node N2 determines that the message is for a new link monitoring protocol session. At this point Node N2 may not have initialized local copies of LAST HEADER INFORMATION RECEIVED tuple and LAST ACTUAL METADATA RECEIVED tuple since this message is the first message received for this link monitoring protocol session. Node N2 therefore may initialize its local copy of LAST HEADER INFORMATION RECEIVED tuple based on the "expected" metadata tuple in the received message and its local copy of LAST ACTUAL METADATA RECEIVED tuple from the "actual" metadata tuple in the received message. Thus, for example, Node N2 may store the following initial local copies:

| Node N2 LAST HEADER INFORMATION RECEIVED | |
|---|---|
| SA/SP | 1.1.1.1/1281 |
| DA/DP | 2.2.2.2/1280 |
| Node N2 LAST ACTUAL METADATA RECEIVED | |
| Act SA/SP | 2.2.2.2/1280 |
| Act DA/DP | 1.1.1.1/1281 |

In order to determine if there is source NAT (or a change in source NAT status) on the incoming communication link from Node N1 to Node N2, Node N2 compares the address/port information tuple in the header with its local copy of LAST HEADER INFORMATION RECEIVED tuple. In this example, Node N2 can determine that there is source NAT on the communication link from Node N1 to Node N2, because the address/port information tuple in the header does not match the local copy of LAST HEADER INFORMATION RECEIVED tuple.

Also, in order to determine if there is source NAT (or a change in source NAT status) on the outgoing communication link from Node N2 to Node N1, Node N2 compares the "actual" metadata tuple in the received message with the local copy of LAST ACTUAL METADATA RECEIVED tuple. This comparison would allow Node N2 to determine if there is source NAT on the communication link from Node N2 to Node N1, although in this first message from Node N1, the "actual" metadata tuple in the received message and the local copy of LAST ACTUAL METADATA RECEIVED tuple (which is based on the "expected" metadata in the received message) are the same, so Node N2 initially determines that there is no source NAT on the communication link from Node N2 to Node N1 (even if there is, in fact, source NAT on that communication link).

Node N2 stores session information from the "expected" metadata and the header, e.g., as part of its session-related data for stateful routing as discussed above, and also may set up flows based on the received address/port information. Node N2 also updates the local copy of the LAST HEADER INFORMATION RECEIVED tuple and the local copy of the LAST ACTUAL METADATA RECEIVED tuple based on the received message. Thus, for example, Node N2 now may store the following local copies:

| Node N2 LAST HEADER INFORMATION RECEIVED (updated) | |
|---|---|
| SA/SP | 3.3.3.3/1381 |
| DA/DP | 2.2.2.2/1280 |
| Node N2 LAST ACTUAL METADATA RECEIVED (updated) | |
| Act SA/SP | 2.2.2.2/1280 |
| Act DA/DP | 1.1.1.1/1281 |

Node N2 transmits a return link monitoring protocol message addressed to Node N1, as follows.

| Header | |
|---|---|
| SA/SP | 2.2.2.2/1280 |
| DA/DP | 3.3.3.3/1381 |
| Metadata | |
| Exp SA/SP | 1.1.1.1/1281 |
| Exp DA/DP | 2.2.2.2/1280 |

-continued

| | |
|---|---|
| Act SA/SP | 3.3.3.3/1381 |
| Act DA/DP | 2.2.2.2/1280 |

Here, Node N2 copies the address/port information tuple from the header of the received message into the "actual" metadata tuple of this message and configures the "expected" metadata tuple in this message to reflect the address/port information that Node N2 expects to receive back from Node N1 (assuming no source NAT device is present on the communication link from Node N2 to Node N1).

Because there is source NAT in both directions in this example, Node N1 may receive the following message:

| Header | |
|---|---|
| SA/SP | 4.4.4.4/1480 |
| DA/DP | 1.1.1.1/1281 |
| Metadata | |
| Exp SA/SP | 1.1.1.1/1281 |
| Exp DA/DP | 2.2.2.2/1280 |
| Act SA/SP | 3.3.3.3/1381 |
| Act DA/DP | 2.2.2.2/1280 |

Here, the destination address and destination port number have been restored by the source NAT device, from 3.3.3.3/1381 to 1.1.1.1/1281, and the source address and source port number have been translated by the source NAT device, from 2.2.2.2/1280 to 4.4.4.4/1480.

In order to determine if there is source NAT (or a change in source NAT status) on the outgoing communication link from Node N1 to Node N2, Node N1 compares the "actual" metadata tuple (i.e., the actual address/port information received by Node N2) with its local copy of LAST ACTUAL METADATA RECEIVED tuple. In this example, Node N1 can determine that there is source NAT on the outgoing communication link from Node N1 to Node N2 because the "actual" metadata tuple received in the message does not match the local copy of LAST ACTUAL METADATA RECEIVED tuple. In certain embodiments, Node N1 may reconfigure a flow associated with the session upon detecting the presence of the source NAT on the outgoing communication link, as discussed below.

Also, in order to determine if there is source NAT (or a change in source NAT status) on the incoming communication link from Node N2 to Node N1, Node N1 compares the address/port information tuple in the header with its local copy of LAST HEADER INFORMATION RECEIVED tuple. In this example, Node N1 can determine that there is source NAT on the incoming communication link from Node N2 to Node N1, because the address/port information tuple in the header does not match its local copy of LAST HEADER INFORMATION RECEIVED tuple. In certain embodiments, Node N1 may reconfigure a flow associated with the session upon detecting the presence of the source NAT on the incoming communication link, as discussed below. Node N1 also stores a local copy of the header information tuple and a local copy of the "actual" metadata tuple. Thus, for example, Node N1 now may store the following local copies:

| Node N1 LAST HEADER INFORMATION RECEIVED (updated) | |
| --- | --- |
| SA/SP | 4.4.4.4/1480 |
| DA/DP | 1.1.1.1/1281 |
| Node N1 LAST ACTUAL METADATA RECEIVED (updated) | |
| Act SA/SP | 3.3.3.3/1381 |
| Act DA/DP | 2.2.2.2/1280 |

Node N1 transmits a return link monitoring protocol message to Node N2, as follows:

| Header | |
| --- | --- |
| SA/SP | 1.1.1.1/1281 |
| DA/DP | 4.4.4.4/1480 |
| Metadata | |
| Exp SA/SP | 2.2.2.2/1280 |
| Exp DA/DP | 1.1.1.1/1281 |
| Act SA/SP | 4.4.4.4/1480 |
| Act DA/DP | 1.1.1.1/1281 |

Here, Node N1 copies the address/port information tuple from the header of the received message into the "actual" metadata tuple of this message and configures the "expected" metadata tuple in this message to reflect the address/port information that Node N1 expects to receive back from Node N2 (which is the same as in original message).

Because there is a source NAT device in this example, Node N2 may receive the following message:

| Header | |
| --- | --- |
| SA/SP | 3.3.3.3/1381 |
| DA/DP | 2.2.2.2/1280 |
| Metadata | |
| Exp SA/SP | 2.2.2.2/1280 |
| Exp DA/DP | 1.1.1.1/1281 |
| Act SA/SP | 4.4.4.4/1480 |
| Act DA/DP | 1.1.1.1/1281 |

In order to determine if there is source NAT (or a change in source NAT status) on the outgoing communication link from Node N2 to Node N1, Node N2 compares the "actual" metadata tuple (i.e., the actual address/port information received by Node N1) with its local copy of LAST ACTUAL METADATA RECEIVED tuple. In this example, Node N2 now can determine that there is source NAT on the outgoing communication link from Node N2 to Node N1 because the "actual" metadata tuple in the received message does not match the local copy of LAST ACTUAL METADATA RECEIVED tuple. Node N2 may reconfigure a flow associated with the session upon detecting the presence of the source NAT on the outgoing communication link, as discussed below.

Also, in order to determine if there is source NAT (or a change in source NAT status) on the incoming communication link from Node N1 to Node N2, Node N2 compares the address/port information tuple in the header of the received message with its local copy of LAST HEADER INFORMATION RECEIVED tuple. In this example, Node N2 can determine that there has been no change in source NAT status on the communication link from Node N1 to Node N2, because the address/port information tuple in the header of the received message matches the local copy of LAST HEADER INFORMATION RECEIVED tuple.

Node N2 updates its local copy of LAST HEADER INFORMATION RECEIVED tuple and its local copy of the LAST ACTUAL METADATA RECEIVED tuple based on the received message. Thus, for example, Node N2 now may store the following local copies:

| Node N2 LAST HEADER INFORMATION RECEIVED (updated) | |
| --- | --- |
| SA/SP | 3.3.3.3/1381 |
| DA/DP | 2.2.2.2/1280 |
| Node N2 LAST ACTUAL METADATA RECEIVED (updated) | |
| Act SA/SP | 4.4.4.4/1480 |
| Act DA/DP | 1.1.1.1/1281 |

Using this mechanism, a node can determine not only that a change in source NAT status occurred, but also the type of source NAT status change. The example given above demonstrates various cases of a node detecting a change from no source NAT to source NAT enabled on a communication link. This mechanism also allows a node to detect source NAT becoming disabled on a communication link (e.g., if the last message received by Node N2 included SA/SP of 1.1.1.1/1281, Node N2 would have detected the change because the address/port information in the header would not have matched the local copy of expected header information but instead would have matched Node N2's expected address/port information). Similarly, this mechanism allows a node to detect a change in address translations (e.g., if the last message received by Node N2 included SA/SP of 5.5.5.5/1581, Node N2 would have detected the change because the address/port information in the header would not have matched the local copy of expected header information and also would not have matched Node N2's expected address/port information).

It should be noted that the common set of "expected" address/port information carried in the messages between Nodes N1 and N2 allow each node to associate the link monitoring protocol message with its associated session, even in the presence of source NAT in both directions as in FIG. 26.

Flow Modification and Action Chains

In certain exemplary embodiments, deactivating the flow configuration information record associated with a flow, such as when a packet associated with the flow is received on the wrong interface or a routing change is being processed, includes the service path setting the valid field of the associated chain descriptor to indicate that the action chain is invalid/deactivated. At this point, no further packets can be forwarded using the deactivated action chain. The service path generates a new action chain for the new flow and attaches it to the old chain descriptor. In order to activate the new action chain, the service path sets the valid field of the chain descriptor to indicate that the action chain is valid/activated, thus permitting packets associated with the affected session/flow to now be forwarded via the new action chain. At this point, the fast path can take over forwarding of packets associated with the session in both directions, using the activated action chain. The service path can delete any obsoleted action chain at an appropriate time, e.g., as a background function.

Figure 29:
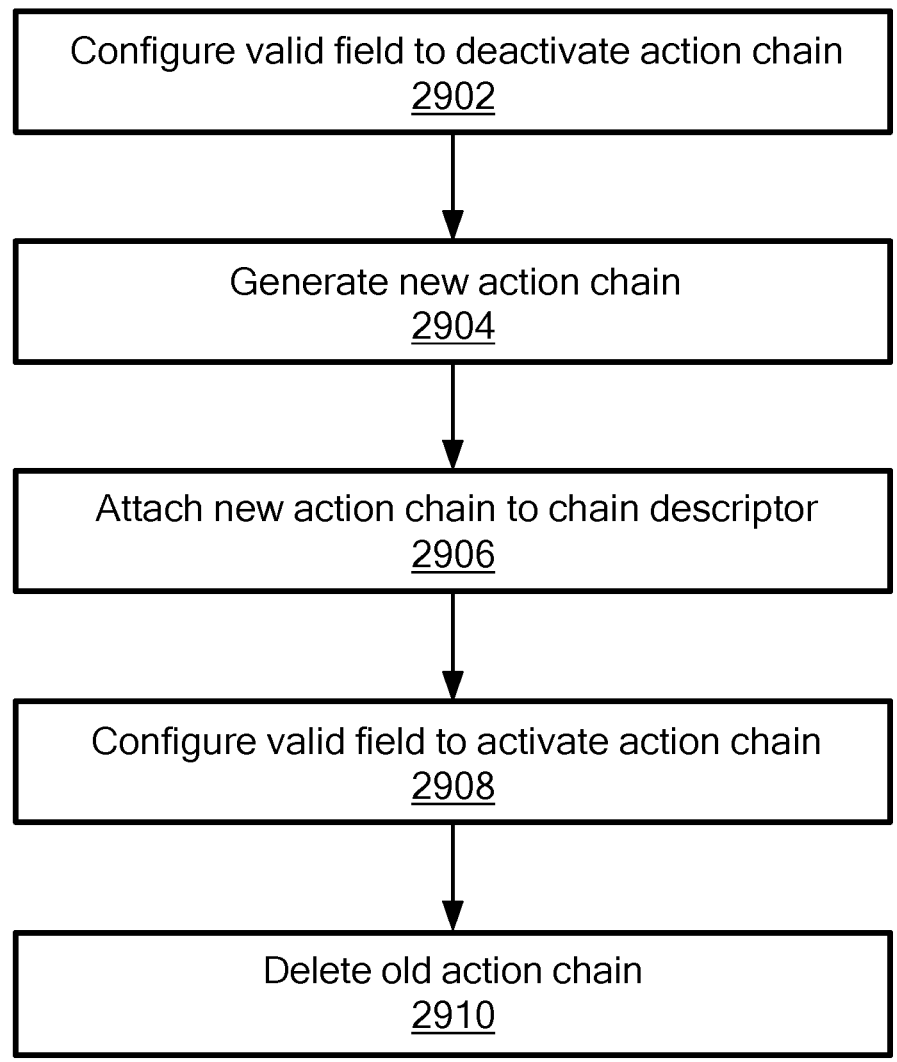
FIG. 29 is a flowchart for modifying a flow using action chains, in accordance with one exemplary embodiment.

FIG. 29 is a flowchart for modifying a flow using action chains, in accordance with one exemplary embodiment. In block 2902, service path configures the valid field of the chain descriptor to deactivate the action chain. In block

2904, the service path generates a new action chain for the session/flow. In block 2906, the service path attaches the new action chain to the chain descriptor. In block 2908, the service path configures the valid field of the chain descriptor to activate the action chain. In block 2910, the service path deletes the old action chain.

Figure 30:
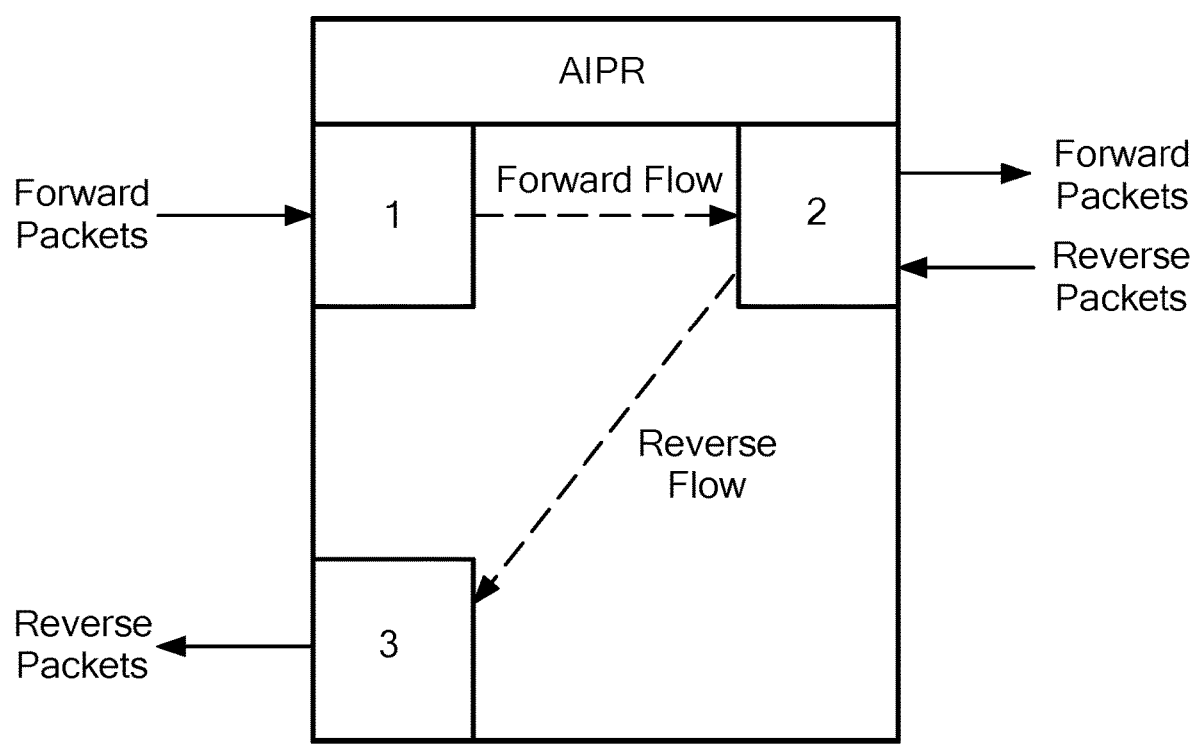
FIG. 30 is a schematic diagram showing separate forward and reverse flows, in accordance with one exemplary embodiment.

In various embodiments, a session may be associated with separate forward and reverse flows having separate action chains. FIG. 30 is a schematic diagram showing separate forward and reverse flows, in accordance with one exemplary embodiment. In this example, forward packets received by the AIPR on interface 1 are forwarded over interface 2 via a forward flow (e.g., associated with a forward action chain), but reverse packets received by the AIPR on interface 2 are forwarded over interface 3 via a reverse flow (e.g., associated with a reverse action chain). Different forward and reverse flows might be used, for example, when the ingress interface used for forward packets is not appropriate for use in forwarding return packets, e.g., as discussed in 4094/1023, which was incorporated by reference above. When a flow modification event occurs as discussed above, both flows generally would be deactivated, modified as needed, and then reactivated, although if one of the flows is not being modified, then, under some circumstances, that flow may be left active even while the other flow is being modified.

Session Continuity Using Shared Context Information

When a flow associated with a session is modified, or when a new flow is created for an existing session, data for the session (e.g., parameters, counters, functions) and flow specific contexts (e.g., TCP state machine, reverse metadata) can be lost, e.g., from an original flow (e.g., action chain) that is being removed or deleted. Thus, in certain exemplary embodiments, such session information (e.g., from the old action chain) is stored as a "shared context" in a shared memory, e.g., a memory that is shared by the fast path and service path. Then, the new or modified flow (e.g., the new action chain) can use the information from the shared context (e.g., TCP state machine, reverse metadata, BFD echo states, etc.) in order to seamlessly continue the session.

Figure 31:
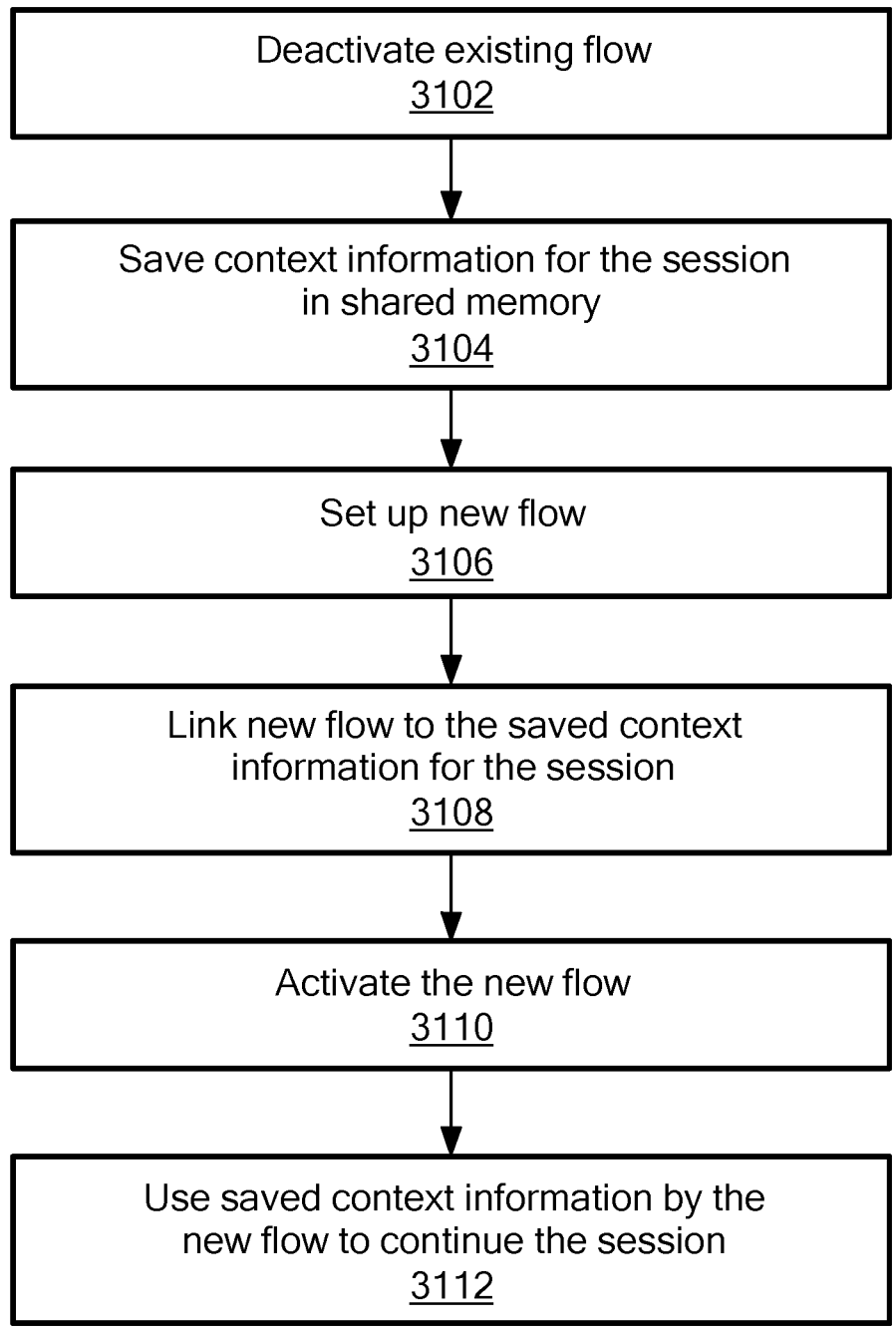
FIG. 31 is a flowchart for session continuity using shared context information, in accordance with one exemplary embodiment.

FIG. 31 is a flowchart for session continuity using shared context information, in accordance with one exemplary embodiment. In block 3102, the router deactivates the existing flow associated with the session. In block 3104, the router saves context information for the session in a shared memory. In block 3106, the router sets up a new flow for the session. In block 3108, the router links the new flow to the saved context information for the session. In block 3110, the router activates the new flow. In block 3112, the new flow uses the saved context information to continue the session.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the REX processor) are necessarily non-conventional because, absent special programming or configuration, the conventional components do not inherently perform the described non-conventional functions.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of forwarding a plurality of related packets by a router including a service path, a forwarding path, and a memory shared by the service path and the forwarding path, the method comprising:
    establishing, by the service path, in the shared memory, a first flow configuration information record defining the first flow to be used by the forwarding path in forwarding related packets from a first ingress interface to a first egress interface of the router;
    forwarding, by the forwarding path, using the first flow stored in the shared memory, a number of related packets from the first ingress interface to the first egress interface;
    determining, by the router, a condition to modify the first flow;
    deactivating the first flow by the router by setting a valid field of the first flow configuration information record to a deactivated state after determining the condition so that the forwarding path is blocked from forwarding related packets using the first flow while the first flow is deactivated, including the forwarding path using the valid field of the first flow configuration information record to determine whether the first flow is activated or deactivated;
    establishing, by the service path, in the shared memory, while the first flow is deactivated, a second flow configuration information record defining a second flow configured for forwarding additional related packets from at least one of (1) the first ingress interface to a second egress interface, (2) a second ingress interface to the first egress interface, or (3) a second ingress interface to a second egress interface; and
    activating the second flow by setting a valid field of the second flow configuration information record to an activated state so that the forwarding path is enabled to forward additional packets using the second flow.

2. A method according to claim 1, further comprising:
    associating, by the router, the first and second flows with a predetermined communication session for the packets, wherein the related packets are packets associated with the predetermined communication session.

3. A method according to claim 2, wherein the predetermined communication session is based on a predetermined set of information associated with the packets.

4. A method according to claim 2, wherein establishing the first flow comprises running a stateful routing protocol to determine at least the first egress interface, and wherein the method further comprises:
    forwarding, by the forwarding path, using the second flow, at least one packet including first packet session metadata associated with the predetermined communication session.

5. A method according to claim 1, wherein determining a condition to modify the first flow comprises:
    receiving a packet on the second ingress interface.

6. A method according to claim 1, wherein determining a condition to modify the first flow comprises:
    monitoring an ingress communication link associated with the first ingress interface;
    monitoring an egress communication link associated with the first egress interface; and
    detecting a failure associated with at least one of the ingress communication link or the egress communication link.

7. A method according to claim 1, wherein determining a condition to modify the first flow comprises:
    running a routing protocol; and
    determining, using the routing protocol, to change a route that affects the first flow.

8. A method according to claim 1, wherein the first flow configuration information record includes an action chain having a chain descriptor linked to a first set of functional blocks, and wherein establishing the second flow comprises:
    establishing a second set of functional blocks; and
    linking the second set of functional blocks to the chain descriptor.

9. A method according to claim 1, further comprising:
    the service path holding any additional related packets received while the first flow is deactivated and providing the held additional related packets to the forwarding path after the second flow is activated so that the forwarding path is enabled to forward the additional related packets using the second flow.

10. A method according to claim 1, further comprising:
    storing context information associated with the first flow;
    linking the second flow to the stored context information; and
    using the stored context information to forward packets using the second flow.

11. A router comprising:
    a plurality of communication interfaces;
    a computer storage; and
    a packet router including a service path, a forwarding path, and a memory shared by the service path and the forwarding path and configured to implement a method of forwarding a plurality of related packets comprising:
    establishing, by the service path, in the shared memory, a first flow configuration information record defining the first flow to be used by the forwarding path in forwarding related packets from a first ingress interface to a first egress interface of the router;
    forwarding, by the forwarding path, using the first flow stored in the shared memory, a number of related packets from the first ingress interface to the first egress interface;
    determining, by the router, a condition to modify the first flow;
    deactivating the first flow by setting a valid field of the first flow configuration information record to a deactivated state after determining the condition so that the forwarding path is blocked from forwarding related packets using the first flow while the first flow is deactivated, including the forwarding path using the valid field of the first flow configuration information record to determine whether the first flow is activated or deactivated;
    establishing, by the service path, in the shared memory, while the first flow is deactivated, a second flow configuration information record defining a second flow configured for forwarding additional related packets from at least one of (1) the first ingress interface to a second egress interface, (2) a second ingress interface to the first egress interface, or (3) a second ingress interface to a second egress interface; and
    activating the second flow by setting a valid field of the second flow configuration information record to an activated state so that the forwarding path is enabled to forward additional packets using the second flow.

12. A router according to claim 11, wherein the packet router is configured to associate the first and second flows with a predetermined communication session for the packets, wherein the related packets are packets associated with the predetermined communication session.

13. A router according to claim 12, wherein the packet router is configured to identify packets associated with the predetermined communication session based on a predetermined set of information associated with the packets.

14. A router according to claim 12, wherein the packet router is configured to establish the first flow by running a stateful routing protocol to determine at least the first egress interface, and wherein the method further comprises:
forwarding, by the forwarding path, using the second flow, at least one packet including first packet session metadata associated with the predetermined communication session.

15. A router according to claim 11, wherein the packet router is configured to determine the condition to modify the first flow upon receiving a packet on the second ingress interface.

16. A router according to claim 11, wherein the packet router is configured to determine the condition to modify the first flow by:
monitoring an ingress communication link associated with the first ingress interface;
monitoring an egress communication link associated with the first egress interface; and
detecting a failure associated with at least one of the ingress communication link or the egress communication link.

17. A router according to claim 11, wherein the packet router is configured to determine the condition to modify the first flow by:
running a routing protocol; and
determining, using the routing protocol, to change a route that affects the first flow.

18. A router according to claim 11, wherein the first flow configuration information record includes an action chain having a chain descriptor linked to a first set of functional blocks, and wherein the service path is configured to establish the second flow by:
establishing a second set of functional blocks; and
linking the second set of functional blocks to the chain descriptor.

19. A router according to claim 11, wherein the service path is configured to hold any additional related packets received while the first flow is deactivated and provide the held additional related packets to the forwarding path after the second flow is activated so that the forwarding path is enabled to forward the additional related packets using the second flow.

20. A router according to claim 11, wherein the packet router is configured to store context information associated with the first flow; link the second flow to the stored context information; and use the stored context information to forward packets using the second flow.

21. A computer program product comprising a tangible, non-transitory computer readable medium having embodied therein a computer program that, when run on at least one computer processor, implements a packet router for a router, the packet router including a service path, a forwarding path, and a memory shared by the service path and the forwarding path and implementing a method of routing a plurality of related packets comprising:
establishing, by the service path, in the shared memory, a first flow configuration information record defining the first flow to be used by the forwarding path in forwarding related packets from a first ingress interface to a first egress interface of the router;
forwarding, by the forwarding path, using the first flow stored in the shared memory, a number of related packets from the first ingress interface to the first egress interface;
determining, by the router, a condition to modify the first flow;
deactivating the first flow by the router by setting a valid field of the first flow configuration information record to a deactivated state after determining the condition so that the forwarding path is blocked from forwarding related packets using the first flow while the first flow is deactivated, including the forwarding path using the valid field of the first flow configuration information record to determine whether the first flow is activated or deactivated;
establishing, by the service path, in the shared memory, while the first flow is deactivated, a second flow configuration information record defining a second flow configured for forwarding additional related packets from at least one of (1) the first ingress interface to a second egress interface, (2) a second ingress interface to the first egress interface, or (3) a second ingress interface to a second egress interface; and
activating the second flow by setting a valid field of the second flow configuration information record to an activated state so that the forwarding path is enabled to forward additional packets using the second flow.

22. A computer program product according to claim 21, wherein the method further comprises:
associating the first and second flows with a predetermined communication session for the packets, wherein the related packets are packets associated with the predetermined communication session.

23. A computer program product according to claim 22, wherein the predetermined communication session is based on a predetermined set of information associated with the packets.

24. A computer program product according to claim 22, wherein establishing the first flow comprises running a stateful routing protocol to determine at least the first egress interface, and wherein the method further comprises:
forwarding, by the forwarding path, using the second flow, at least one packet including first packet session metadata associated with the predetermined communication session.

25. A computer program product according to claim 21, wherein determining a condition to modify the first flow comprises:
receiving a packet on the second ingress interface.

26. A computer program product according to claim 21, wherein determining a condition to modify the first flow comprises:
monitoring an ingress communication link associated with the first ingress interface;
monitoring an egress communication link associated with the first egress interface; and
detecting a failure associated with at least one of the ingress communication link or the egress communication link.

27. A computer program product according to claim 21, wherein determining a condition to modify the first flow comprises:

running a routing protocol; and determining, using the routing protocol, to change a route that affects the first flow.

28. A computer program product according to claim 21, wherein the first flow configuration information record includes an action chain having a chain descriptor linked to a first set of functional blocks, and wherein establishing the second flow comprises:

establishing a second set of functional blocks; and linking the second set of functional blocks to the chain descriptor.

29. A computer program product according to claim 21, wherein the method further comprises:

storing context information associated with the first flow;

linking the second flow to the stored context information; and using the stored context information to forward packets using the second flow.

30. A computer program product according to claim 21, wherein the method further comprises:

the service path holding any additional related packets received while the first flow is deactivated and providing the held additional related packets to the forwarding path after the second flow is activated so that the forwarding path is enabled to forward the additional related packets using the second flow.

\* \* \* \* \*